United States Patent [19]
Meikle et al.

[11] Patent Number: 6,160,678
[45] Date of Patent: *Dec. 12, 2000

[54] AUTOCHANGER FOR STORING AND TRANSFERRING MULTIPLE MEDIA ITEMS, SUCH AS TAPE CARTRIDGES, RELATIVE TO A READ/WRITE MECHANISM

[75] Inventors: William Stewart Meikle, Portishead; Steven Andrew Dimond, Stoke Gifford; Phillip Roy Williams, Bradley Stoke North, all of United Kingdom

[73] Assignee: Hewlett-Packard Company, Palo Alto, Calif.

[*] Notice: This patent is subject to a terminal disclaimer.

[21] Appl. No.: 09/339,182

[22] Filed: Jun. 24, 1999

Related U.S. Application Data

[63] Continuation of application No. 08/059,939, May 13, 1993.

[30] Foreign Application Priority Data

May 15, 1992 [EP] European Pat. Off. .......... 92 3 04 388
Dec. 9, 1992 [EP] European Pat. Off. .......... 92 3 11 221

[51] Int. Cl.[7] ................................................. G11B 15/68
[52] U.S. Cl. .............................................................. 360/92
[58] Field of Search ............................... 360/92; 369/36, 369/178, 191, 192

[56] References Cited

U.S. PATENT DOCUMENTS

| 3,484,055 | 12/1969 | Raine ................................. 242/181 |
| 3,617,066 | 11/1971 | Foelkel et al. ..................... 274/4 F |
| 3,682,480 | 8/1972 | Ban .................................... 274/4 F |
| 3,693,981 | 9/1972 | Ban .................................... 274/4 F |
| 4,287,541 | 9/1981 | Tanahashi et al. ................... 360/92 |
| 4,484,239 | 11/1984 | Timm ................................... 360/92 |
| 4,622,610 | 11/1986 | Makigawa ............................ 360/92 |
| 4,789,907 | 12/1988 | Fischetti et al. ................... 360/33.1 |
| 4,841,499 | 6/1989 | Takahashi et al. ................... 369/38 |
| 4,879,615 | 11/1989 | Teranishi et al. ................... 369/34 |
| 4,907,889 | 3/1990 | Simone ................................. 360/92 |
| 4,979,060 | 12/1990 | Tanigawa .............................. 360/92 |
| 4,984,108 | 1/1991 | Grant et al. ......................... 360/92 |
| 5,021,901 | 6/1991 | Mondocea et al. .................... 360/92 |
| 5,088,655 | 2/1992 | Nakanishi ........................... 242/198 |
| 5,089,920 | 2/1992 | Bryer et al. ......................... 360/92 |
| 5,148,332 | 9/1992 | Tomita et al. ....................... 360/92 |
| 5,184,260 | 2/1993 | Pierrat ................................. 360/92 |
| 5,208,791 | 5/1993 | Onishi et al. ....................... 369/36 |
| 5,220,552 | 6/1993 | Yokoi et al. ...................... 369/77.2 |
| 5,236,258 | 8/1993 | Bunch .............................. 312/9.31 |
| 5,285,333 | 2/1994 | Barr et al. ........................... 360/92 |
| 5,402,285 | 3/1995 | Theobald, Jr. et al. .............. 360/69 |
| 5,469,310 | 11/1995 | Slocum et al. ....................... 360/92 |

FOREIGN PATENT DOCUMENTS

| 0 060 396 A3 | 9/1982 | European Pat. Off. . |
| 0 261 410 | 3/1988 | European Pat. Off. . |
| 0 310 427 A2 | 4/1989 | European Pat. Off. . |
| 0 357 814 A1 | 3/1990 | European Pat. Off. . |
| 0 389 199 A3 | 9/1990 | European Pat. Off. . |
| 0 392 620 A3 | 10/1990 | European Pat. Off. . |
| 0 467 187 A3 | 1/1992 | European Pat. Off. . |
| 2 578 676 | 9/1986 | France . |
| 2 661 543 | 10/1991 | France . |
| 3019167 | 1/1991 | Japan . |
| WO 82/00732 | 3/1982 | WIPO . |
| WO 86/02192 | 4/1986 | WIPO . |
| WO 88/08194 | 10/1988 | WIPO . |

Primary Examiner—William R. Korzuch

[57] ABSTRACT

An autochanger for DAT cassettes comprises a 5¼ inch form factor housing having a tape drive mechanism, a magazine for six DAT cassettes and a transfer mechanism for transporting DAT cassettes between a storage area and the tape drive mechanism. A turntable mounted in the underside of a housing lid rotates the magazine about 180° so all of the DAT cassettes in the magazine are accessible from a single direction.

29 Claims, 16 Drawing Sheets

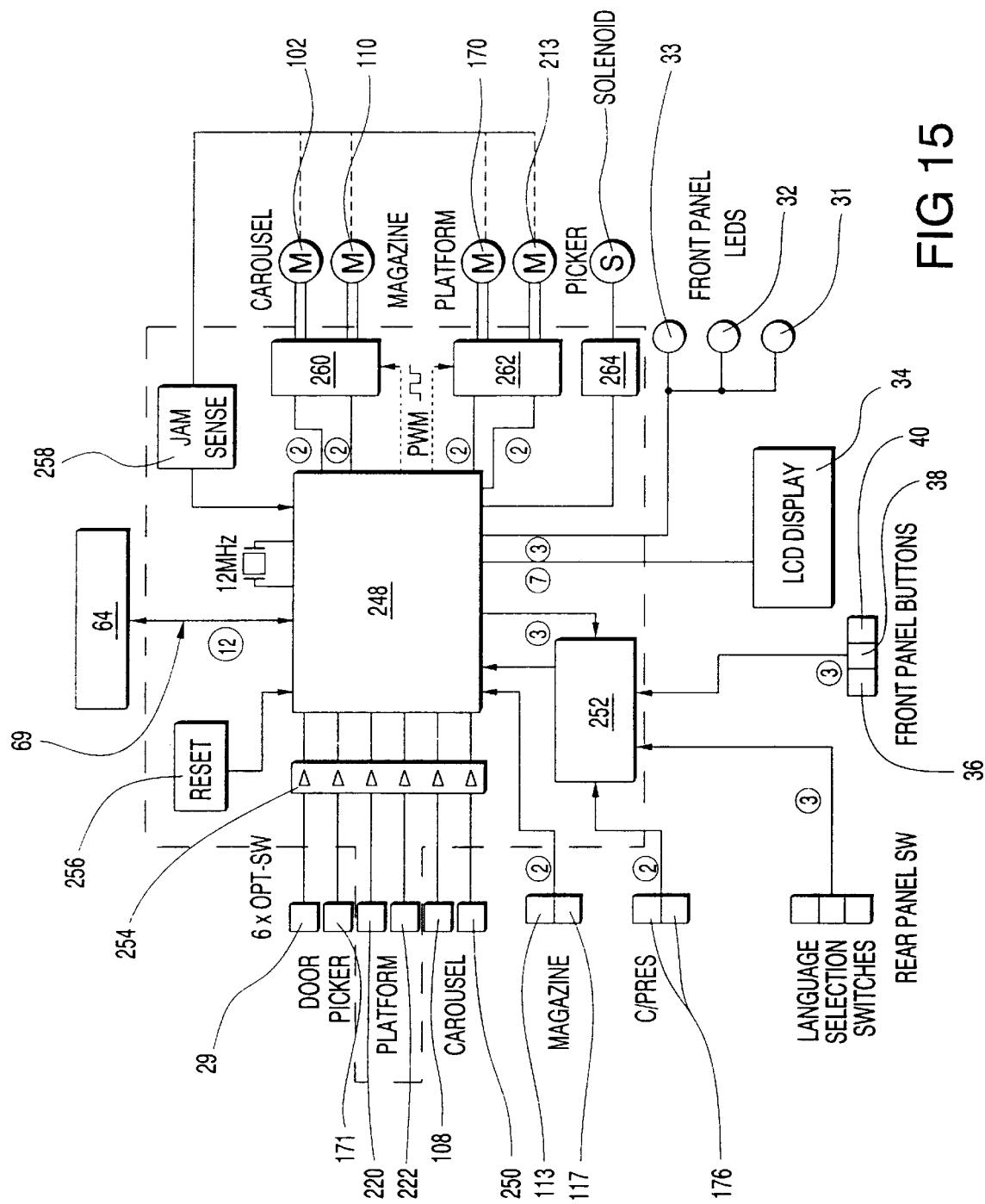

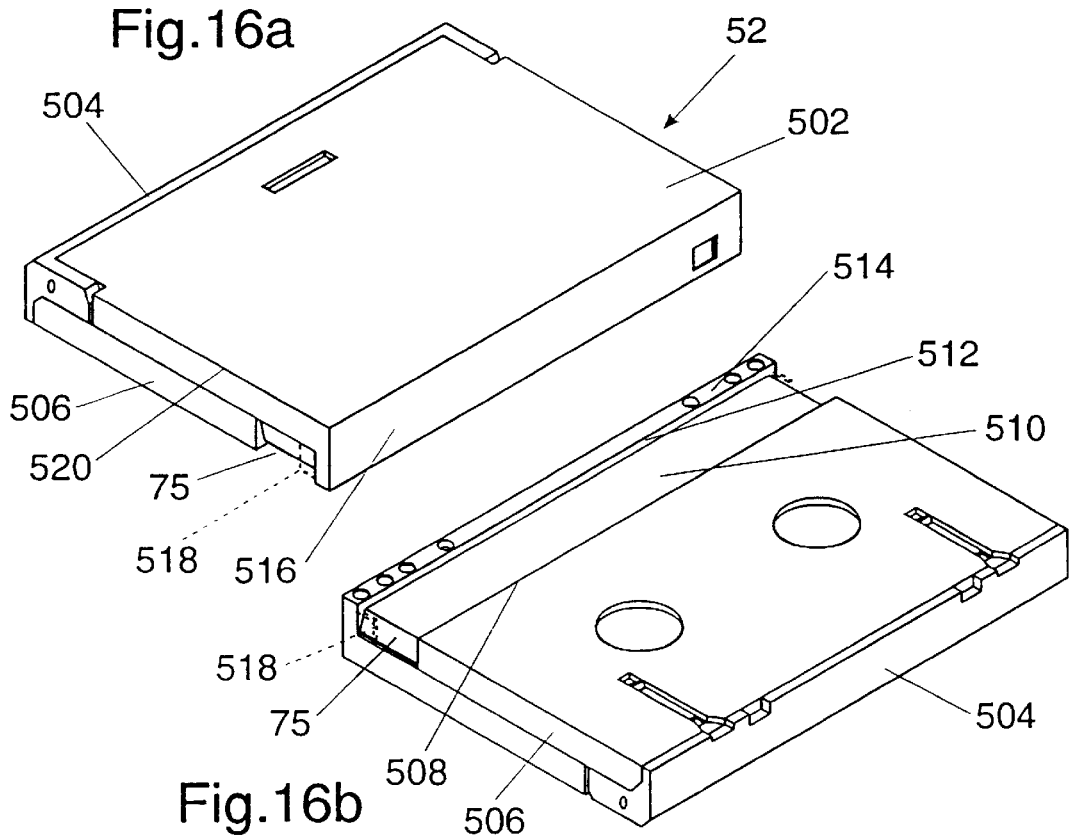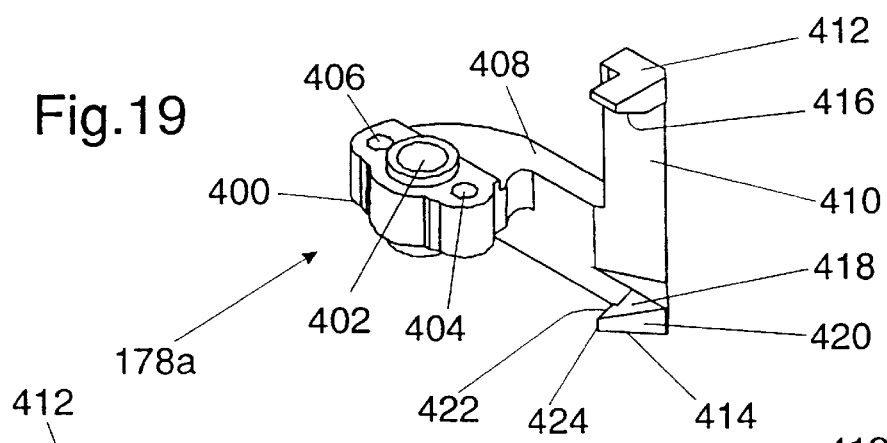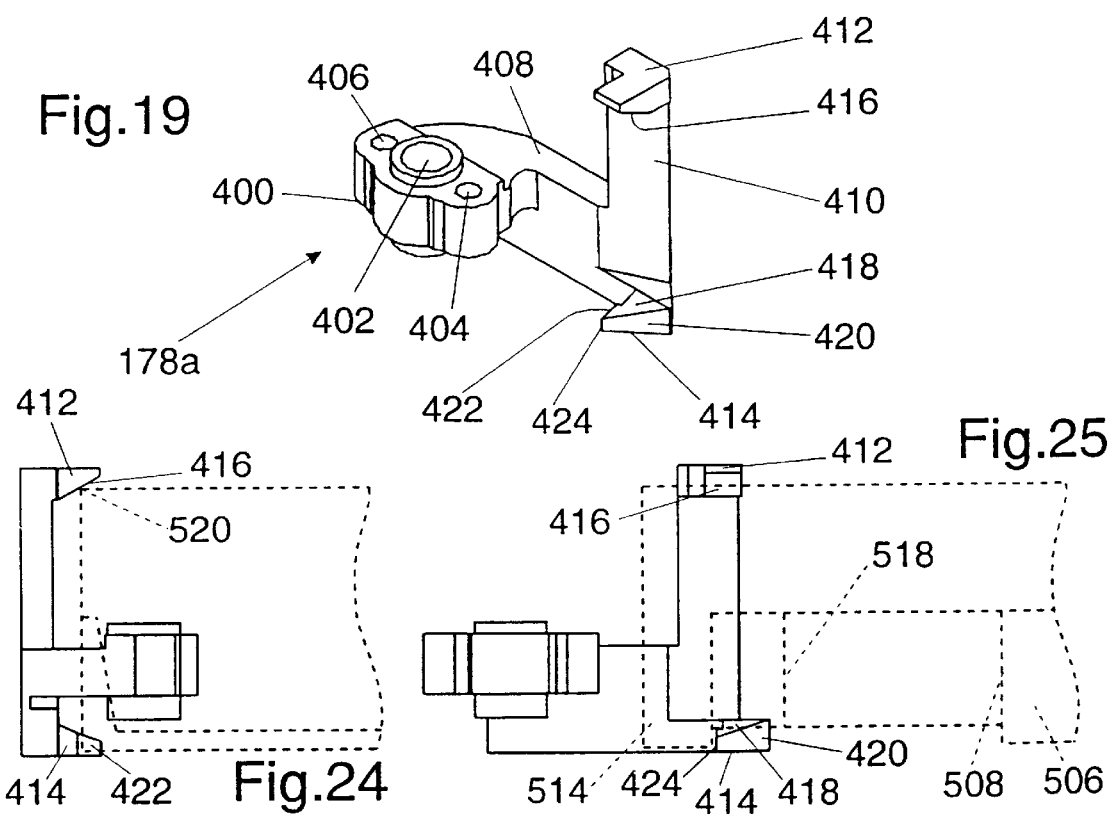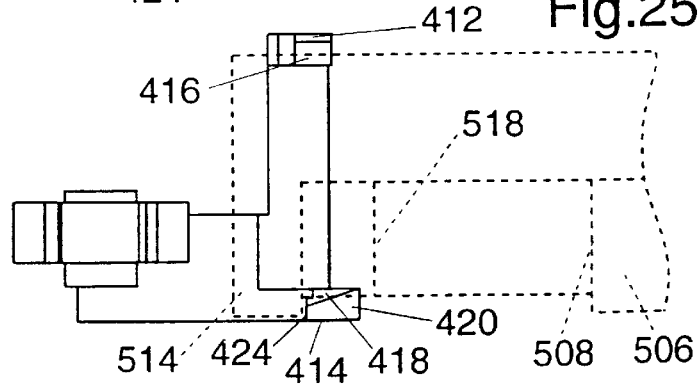

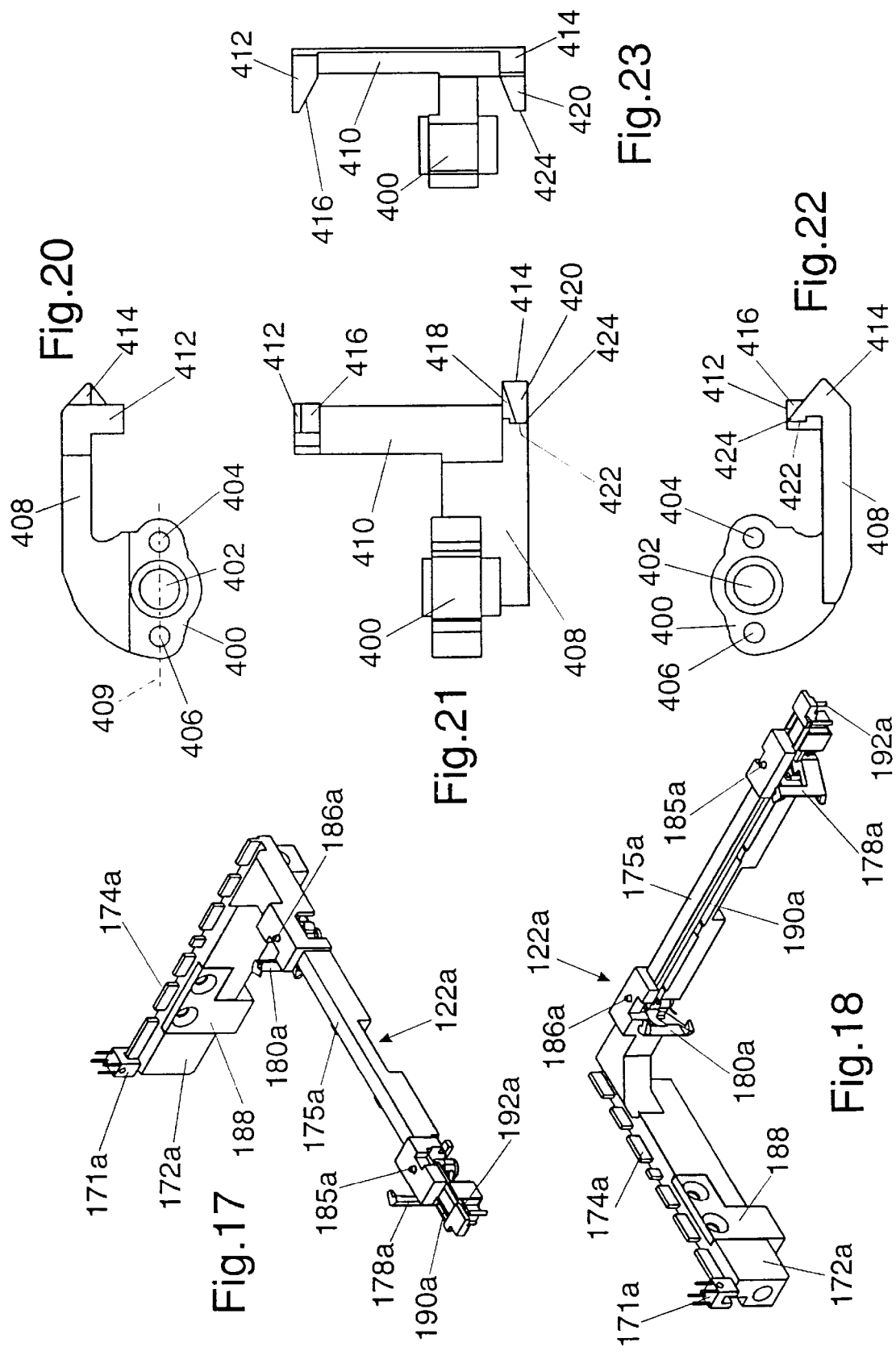

AUTOCHANGER FOR STORING AND TRANSFERRING MULTIPLE MEDIA ITEMS, SUCH AS TAPE CARTRIDGES, RELATIVE TO A READ/WRITE MECHANISM

This application is a continuation of application Ser. No. 08/059,939 filed May 13, 1993 patent pending.

TECHNICAL FIELD

The present invention relates to an autochanger for storing items of recording media and transferring these to and from a read/write mechanism. The specific embodiment which will be described relates to an autochanger for digital audio tapes. In this field various terms are used for tape autochangers including "stackers", "libraries", "autoloaders", "loaders", "autochangers" and "changers".

BRIEF DESCRIPTION OF PRIOR ART

There are very many examples of known autochangers for tape cassettes of various kinds and also for other forms of media, such as disk. One example is described in European Patent No. 0 197 099 and discloses a tape autochanger in which tape cassettes are stacked in a fixed magazine and are transferred to and from a fixed tape drive mechanism by a cassette displacement mechanism which moves vertically along the stacked cassettes and horizontally between the magazine and the tape drive mechanism.

In an autochanger for tape cassettes disclosed in European patent application No. 0 398 199 (Mitsubishi), cassettes are mounted on a rotatable base which pivots to bring a selected cassette into engagement with a drive mechanism. In other embodiments described in that patent application, the drive mechanism is movable into contact with a selected cassette.

Another example is the autochanger described in European patent application No. 0 392 620 (Laser Magnetic Storage) having a magazine storing tape cassettes in a single vertical stack and a vertically movable elevator for transporting cassettes from the back of the magazine to a drive mechanism.

A further example is the tape autochanger described in European patent application No. 0 467 187 (Pierrat). The autochanger described stores cassettes on two decks with mechanical linkages for shunting the cassettes linearly along the decks from and to a pick up position where they can be picked up by a gripper which moves vertically and horizontally to transfer the cassettes between the storage area and a tape drive. A similar design of tape autochanger is described in U.S. Pat. No. 5,089,920 (WangDAT).

SUMMARY OF THE INVENTION

According to the present invention we provide apparatus for storing items of recording media and for transferring media items to and from a mechanism for reading and/or writing to the media items, said apparatus comprising:

a storage area for storing a plurality of media items so that these are spaced both around and along an axis, said mechanism being in a location which is fixed relative to said storage area;

means for rotating the stored media items as one body about said axis so as to permit access to any of the media items from one direction;

transfer means operable to collect media items from said one direction and to transfer media items between the storage area and said mechanism.

The present invention provides an autochanger which is able to be particularly compact whilst permitting easy access to the stored media items without the need for complicated mechanical assemblies for moving the media items within the autochanger.

The present invention also has the significant advantage of allowing access to any of the media items from one direction.

In the particular embodiment to be described the axis of rotation is parallel to the direction of movement of the transfer means between the storage area and the mechanism.

Preferably, the apparatus together with said mechanism is configured to fit within a standard peripheral form factor housing. This feature provides an autochanger having the considerable advantage of fitting within a standard peripheral form factor. Thus it can easily be built into a standard computer peripheral housing in a manner which is safe in that no parts protrude or are exposed and which is also aesthetically pleasing. By standard peripheral form factor is meant the peripheral form factors which are de-facto standards or official standards and are widely recognised as such. Examples of standard peripheral form factors are 8", 5¼" and 3½" form factors. In the embodiment to be described, the autochanger holds digital audio tape (DAT) cartridges (also called cassettes) and fits within a standard 5¼ inch peripheral form factor.

Preferably, the apparatus is adapted to receive a magazine carrying media items and the rotating means is operable to rotate the magazine. This allows several tape cartridges to be loaded or unloaded from the autochanger at one time. In the embodiment to be described there is a toothed drive wheel for engaging teeth on the magazine to help retract and eject the magazine.

Media items, such as DAT cartridges, may be stored in two stacks equally spaced around said axis of rotation. The stored media items need to be rotated through 180° to achieve access to all of them from one direction. Alternatively, the media items may be stored in staggered formation spaced around said axis of rotation e.g. so that rotations of 90° are required to achieve access to all of the media items from one direction. In the embodiments to be described, the autochanger can store up to six DAT cartridges.

The means for rotating the media items may be a turntable, which may be mounted on the underside of the top plate of a housing for the apparatus so as to be rotatable to and fro through 180°.

The transfer means may comprise a platform configured to transport a media item between the storage area and the mechanism and a picker device which is movable relative to the platform to move media items onto and off the platform. The picker device may comprise opposed fingers for engaging respective sides of a media item, for example by engaging notches in its side edges. In embodiments to be described, the picker fingers are biassed inwardly and the apparatus comprises means for automatically deflecting the picker fingers outwardly. In those embodiments the picker fingers are pivotably mounted and the deflecting means comprises two rods movable in the same direction by a deflecting member so that each rod abuts one of the picker fingers and deflects it outwardly. In this way, only one deflecting member is required to open the two picker fingers.

In one embodiment, for use with media items having spaced sides and a rib extending between said sides, the picker device comprises picker fingers mounted for movement with a component of motion towards one another, each picker finger having two opposed faces oriented relative to one another to define a tapered opening, whereby upon movement of the picker fingers towards a media item located therebetween said tapered openings accommodate respective sides of the media item and a portion of each picker finger engages said rib for movement of the media item onto and off the platform.

Apparatus of the present invention may comprise means for moving the transfer means between the storage area and the mechanism in the form of a slidable plate having a cam which co-operates with the transfer means and is profiled so that horizontal sliding of the plate causes vertical movement of the transfer means. Preferably, the cam is stepped in shape so as to define plurality of vertical positions for the transfer means. The cam may be in the form of a groove engaged by a connecting pin on the transfer means. For added stability the apparatus preferably also comprises vertical guide means positioned adjacent the cam for guiding the vertical movement of the transfer means. The vertical guide means may be a fixed plate having a vertical groove providing the vertical guide means.

In the embodiment to be described the first slidable plate is positioned on one side of the apparatus and a second slidable plate positioned on the opposite side of the apparatus and interconnected to the first slidable plate so that sliding movement of one of the slidable plates causes the other slidable plate to slide in the opposite direction. The first and second slidable plates may be interconnected by a pivotably mounted arm. The second slidable plate may comprise a cam oppositely profiled to the cam of the first slidable plate and which also co-operates with the transfer means. This provides a stable arrangement for lifting and lowering the platform supported on both sides.

There is a door in the apparatus for enabling media items to be inserted and ejected. In the embodiment to be described movement of one or more of the sidable plates effects opening of a door in the apparatus for receiving media items. In that embodiment, movement of one or more of the slidable plates also effects locking of the door for receiving media items. This arrangement has the advantage of reducing the number of components used in the apparatus.

According to a second aspect of the present invention we provide autochanger apparatus comprising:

a generally elongate housing;
a mechanism for reading and/or writing data items which is positioned at the base and rear of the housing and having an opening facing forwardly in the housing for receiving media items;
an area for storing media items above the mechanism;
transfer means positioned at the front of the housing for transporting media items between the storage area and the mechanism, and
means for rotating stored media items as one body so that all stored media items are accessible to the transfer means.

In the description and in the claims, the terms vertical, horizontal, and the like are used for descriptive purposes. However, it is understood that the embodiment of the invention described here is capable of operation in any orientation and the terms so used are only for the purpose of describing relative positions and are interchangeable under appropriate circumstances. For example, the tape cartridges are described as being held as two vertical stacks in the magazine. The autochanger may be used on its side in which case the terms vertical and horizontal need to be interchanged.

BRIEF DESCRIPTION OF THE DRAWINGS

Specific embodiments of the present invention will now be described, by way of example, with reference to the accompanying drawings:

FIG. 15 is a controller block diagram of the autochanger of the present invention;

FIGS. 16a and 16b show a standard DAT cartridge;

FIGS. 17 and 18 are perspective views of a modified picker device;

FIG. 19 is a perspective view of a picker finger forming part of the picker device of FIGS. 17 and 18;

FIGS. 20 to 23 are elevation and plan views of the picker finger of FIG. 19;

FIG. 24 is a view from the rear of a DAT cartridge showing the picker finger of FIG. 19 engaging the cartridge; and FIG. 25 is a view from the side of a DAT cartridge showing the picker finger of FIG. 19 engaging the cartridge.

DESCRIPTION OF THE INVENTION

Figure 1:
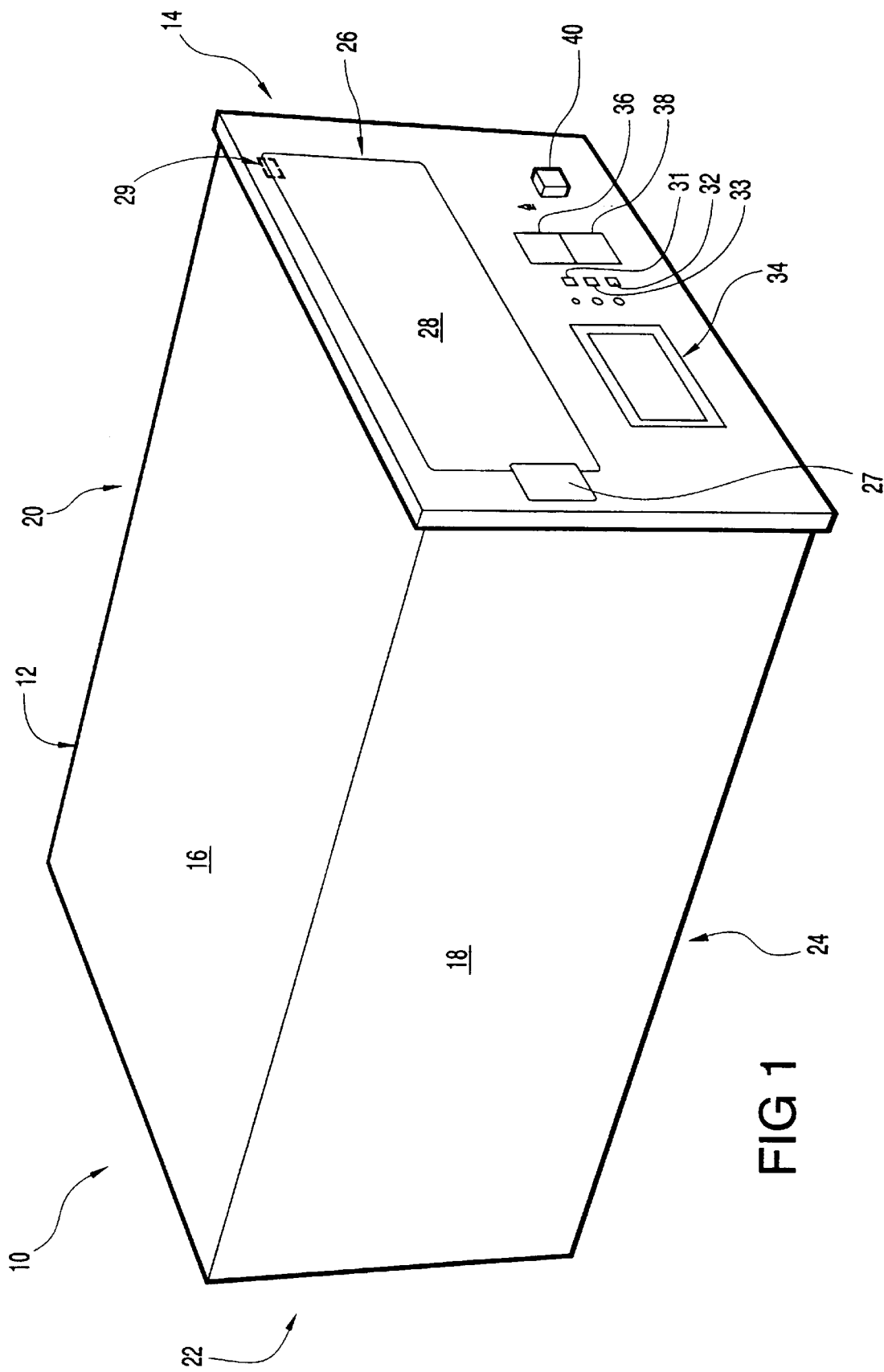
FIG. 1 is a perspective view of an autochanger according to the present invention.

Referring to FIG. 1, an autochanger indicated generally at 10 comprises a housing 12 and a front panel 14. The autochanger 10 is configured as a standard 5¼ inch form factor size. The housing 12 is rectangular in cross section and has a top panel 16, side panels 18 and 20, a rear panel 22 and a base panel 24. The front panel 14 comprises a slot 26 closable by a spring-biased door 28 which pivots about a bottom hinge. The slot 26 enables a magazine to be inserted and removed from the autochanger 10. There is an internal sensor 29 (shown dotted) which detects when the door 28 is opened. The door 28 is lockable as will be described. A keying member 27 is mounted on the front panel 14 so as to overlap the slot 26. The keying member 27 is set into recesses in the front panel 14 and the door 28 so as to maintain a flush surface. The purpose of the keying member is to ensure correct orientation of a magazine as will be described.

The front panel 14 comprises a set of three LEDs 31–33 each of which is accompanied by an explanatory symbol. The top LED 31 indicates when there is some activity concerning a magazine such as loading or unloading. The middle LED 32 denotes data-related activity, such as when data is being read from or written to a tape by the drive mechanism. The lower LED 33 is a warning light denoting a problem with the apparatus. The LEDs are designed to be seen by a user from a distance.

For more detailed information, a liquid crystal display (LCD) 34 is provided. The LCD 34 displays the following information:

i) which tape slots in the magazine were occupied by tape cartridges when the magazine was loaded;

ii) which one of those tape cartridges is currently in the drive mechanism;

iii) whether the tape cartridge in the drive mechanism is write-protected;

iv) whether data compression/decompression is being employed in writing/reading data to/from the tape cartridge in the drive mechanism;

v) how much of the current tape has been read/written; and vi) a line of message text.

The front panel 14 also comprises three buttons 36, 38 and 40, each with an adjacent explanatory symbol. Button 36 enables the user to select a specific tape cartridge. Pressing the button 36 causes the LCD 34 cyclically to display the options according to which tape cartridges are present in a loaded magazine, and pressing it again selects a particular tape cartridge. Pressing the button 38 causes a selected tape cartridge automatically to be loaded into the drive mechanism. Button 40 causes the magazine to be ejected.

Figure 2:
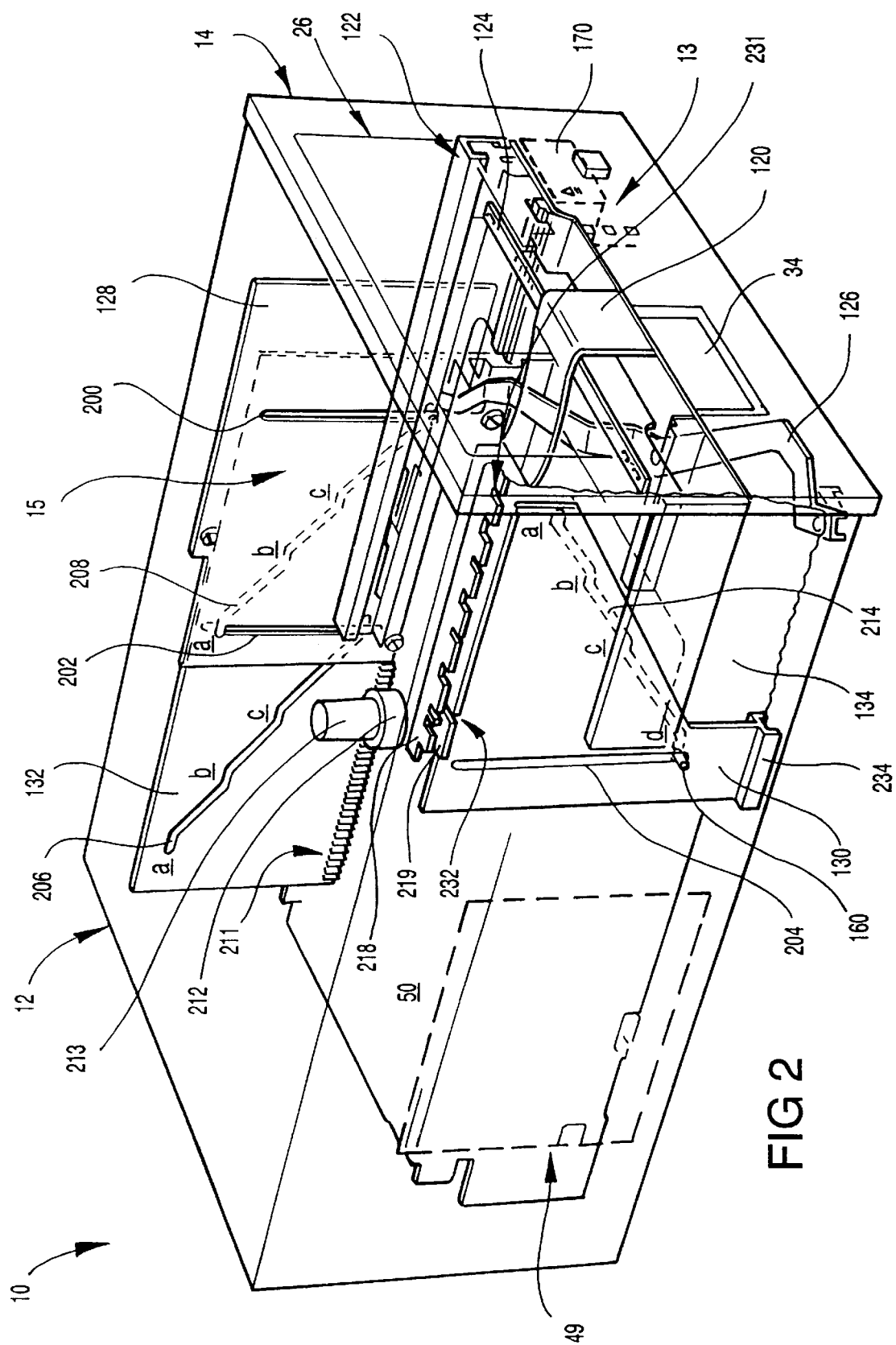
FIG. 2 is a front perspective view of the autochanger of FIG. 1 showing some of the internal components.

Referring to FIG. 2, the housing 12 is shown in outline only and the front panel 14 is shown cut away underneath the slot 26 to reveal some of the internal components of the autochanger 10. At the base of the rear of the housing 12 the outline of a tape drive mechanism 50 is shown. The tape drive mechanism 50 is a 3½ inch form factor size and comprises a known mechanism which will not be described in detail here. The drive mechanism 50 may be able to read and write compressed data. For example, the tape drive mechanism 50 could be that used in existing Hewlett-Packard product number HP35480, minus parts of the standard housing for that product. At the front of the housing 12 is a transfer mechanism 13 for transferring tape cartridges from a storage position to the tape drive mechanism 50. The transfer mechanism 13 comprises several components and will be described in detail below. In the upper part of the housing 12 is a storage area 15 for receiving a magazine containing up to six tape cartridges and which also comprises means for rotating the magazine as will be described in detail below. Also housed along one side of the housing 12 is a printed circuit board 49 (shown in outline only) for controlling the operation of the autochanger 10. It will be understood that the number and size of printed circuit boards used in an autochanger is a matter of design choice. For example, a separate printed circuit board could be associated with the switches and indicators on the front panel 14.

Figure 3:
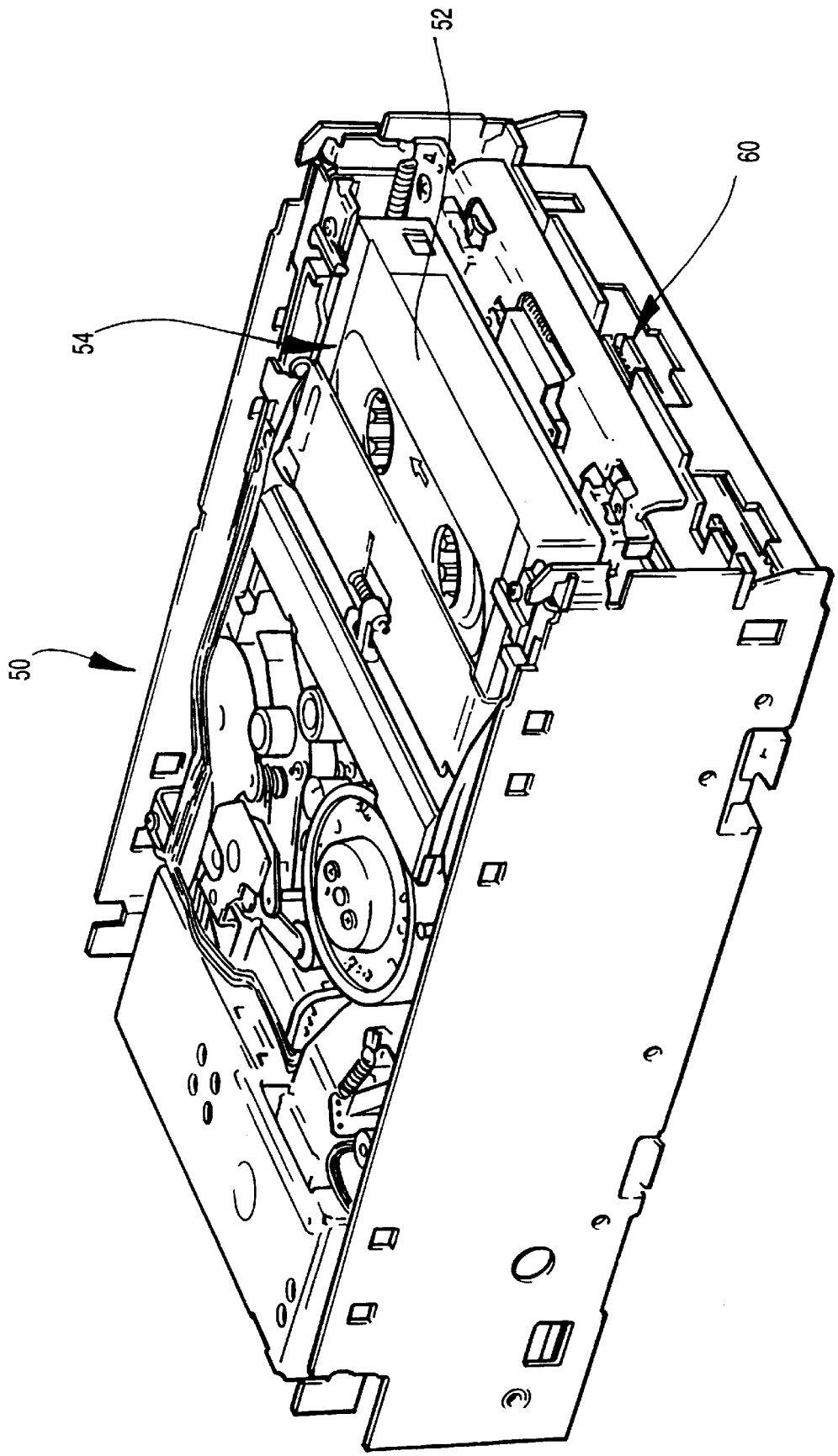
FIG. 3 is a front perspective view of the drive mechanism of the autochanger with a DAT cartridge loaded.
Figure 4:
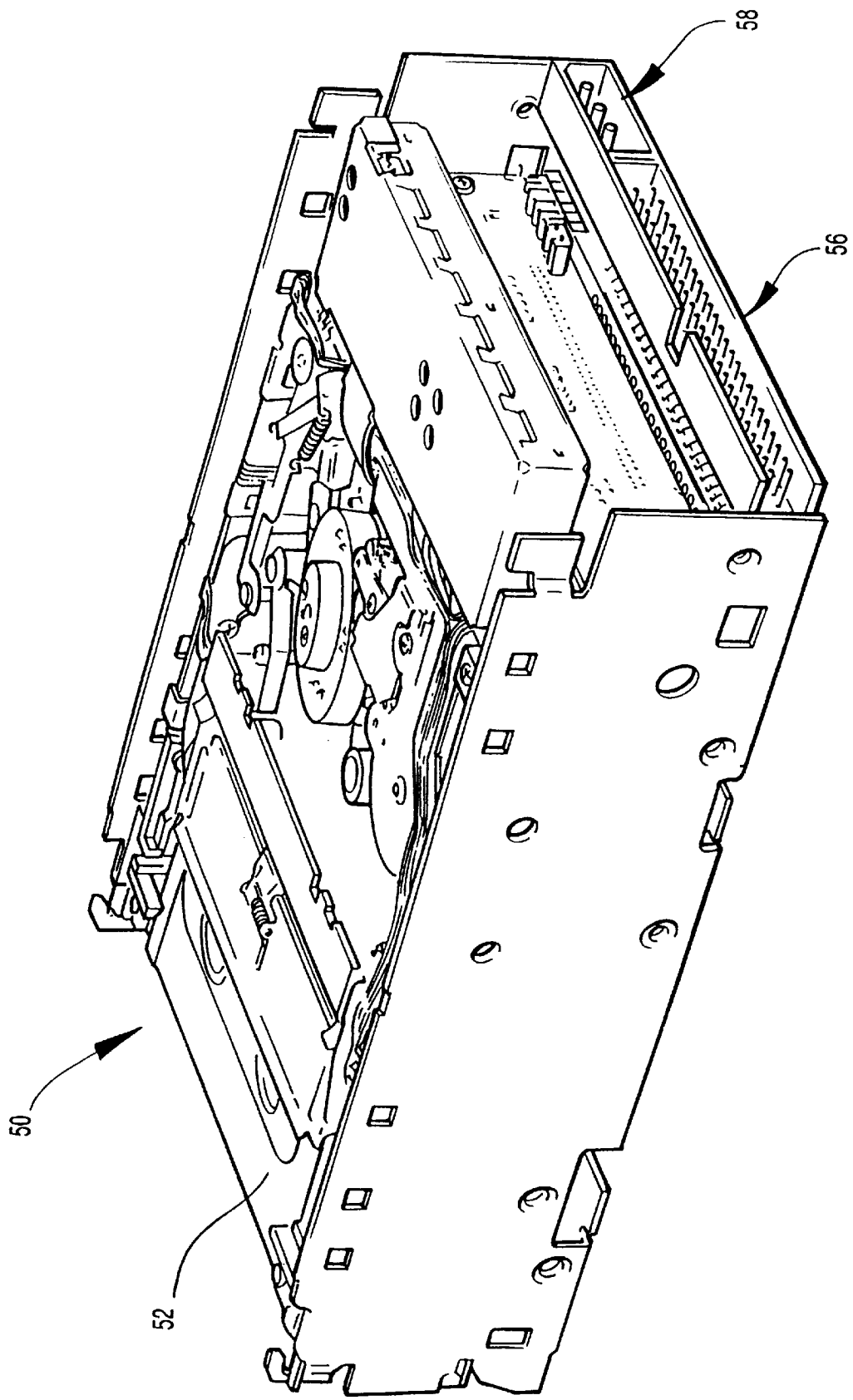
FIG. 4 is a rear perspective view of the drive mechanism.

Referring to FIGS. 3 and 4, the drive mechanism 50 is shown holding a digital audio tape (DAT) cartridge 52. The upper front part of the drive mechanism housing has a cut-away 54 to provide for a tape cartridge being lowered slightly within the length of the drive housing. The rear of the drive mechanism, shown in FIG. 4, provides the necessary connections for power and control signals to the drive mechanism. A socket 56 is for a control connection and a socket 58 is for connecting a power lead to the drive mechanism 50. The sockets 56 and 58 are exposed in the rear panel 22 of the housing 12. This is one advantage of positioning the drive mechanism 50 at the rear of the autochanger 10. Positioning the drive mechanism at the bottom of the autochanger 10 has the advantage of facilitating access to configuration switches (not shown) provided in the base of the drive mechanism. An aperture is provided in the base panel 24 of the autochanger 10 to permit access to these configuration switches. The rear panel 22 also comprises a second power socket for the autochanger and language switches to permit selection of the language in which messages in the LCD 34 appear. The drive mechanism 50 comprises a socket 60 at the front for permitting control signals to be transferred between the firmware of the drive mechanism 50 and the printed circuit board 49 of the autochanger 10.

Figure 5:
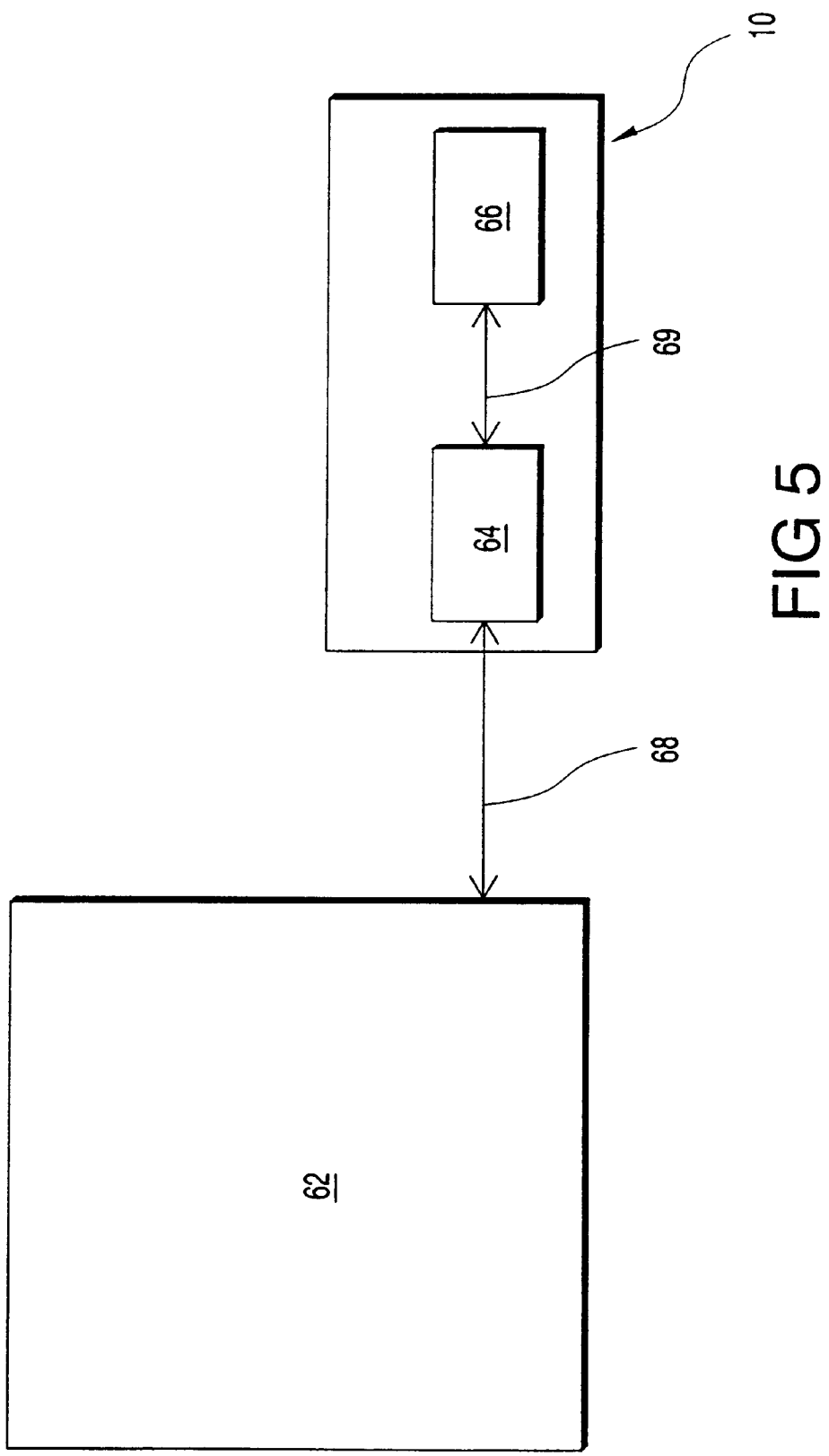
FIG. 5 is a schematic diagram of a host computer connected to an autochanger of the present invention.

FIG. 5 shows schematically the components of a system utilising the autochanger 10. A host computer 62 passes control signals via an interface 68 to the firmware 64 of the drive mechanism which interprets these and transfers control signals as appropriate via a second interface 69 to the controller 66 of the autochanger 10, and vice-versa. The interface 68 is a SCSI interface, specifically Small Computer Systems Interface, SCSI, as per draft proposed American National Standard X3T9.2/86-109 Revision 10. The design of the interface 69 is largely dictated by the specific drive mechanism used and is within the ability of the average person skilled in the art of such interface design.

The DAT cartridge 52 is shown in FIGS. 16*a* and 16*b*, and has a generally rectangular body shell 502 enclosing two spools with a length of 4 mm wide magnetic tape wound around and extending between them. Access to the tape is obtained via an opening along one long edge of the cartridge, under a pivoted lid 504 which is spring-loaded into a closed position covering the opening when the cartridge is not in use. The lid 504 is locked in this position by a sliding cover 506 which wraps around the underside of the cartridge 52 and extends beneath arms at each end of the lid, and is normally held closed by locking tabs which protrude from the body shell through apertures in elongate recesses in the surface of the cover. When the sliding cover 506 is in its closed position its rear edge 508 is spaced from the rear of the cartridge, defining a channel 510 which extends behind the sliding cover across the width of the cartridge, and partially up its sides in the form of notches 75. The rear wall 512 of this channel is formed by a rib 514 extending between the channel 510 and the rear face 516 of the cartridge. In some cases the notches 75 may be partially closed by a wall section 518 (shown dashed in the Figures) extending forwards and downwards from the upper rear corner of the notch.

Figure 6:
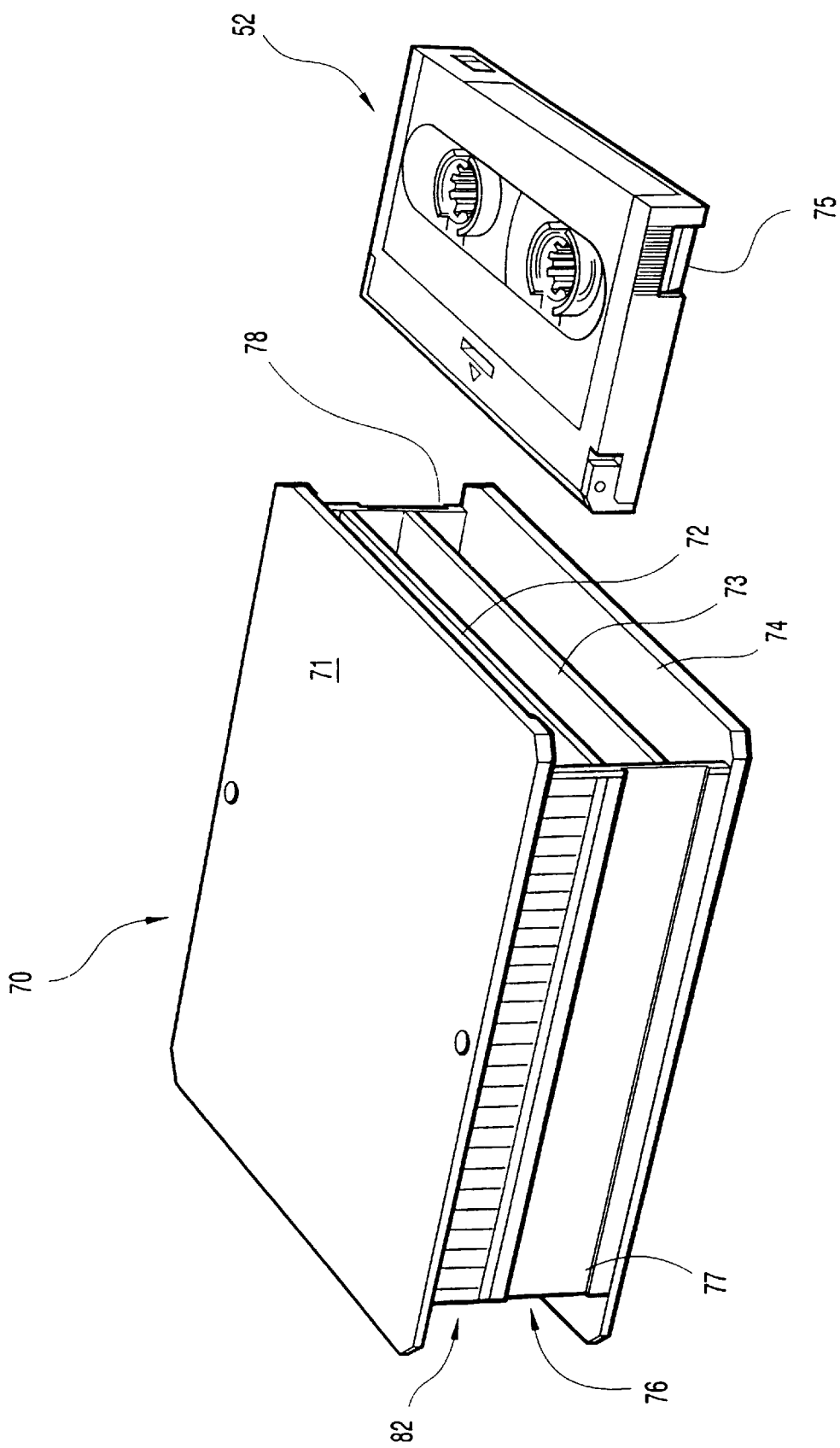
FIG. 6 is a perspective view of a first kind of magazine for holding tape cartridges.

Referring to FIG. 6, a magazine 70 made from moulded plastics comprises six slots, three at each end, each configured to receive and retain a DAT cartridge 52. The magazine 70 comprises four generally rectangular plates 71–74 which are supported in an equally spaced manner by side pieces 76 and 78. The side piece 76 has a toothed section 82 on its upper part which extends the length of the magazine 70. The side piece 76 has a recess 77 running along its full length. The recess 77 co-operates with the keying member 27 (FIG. 1) when the magazine is correctly inserted. The slots for receiving DAT cartridges are each provided with retaining means (not shown) which retain a DAT cartridge in a secure manner and which co-operate with the contours of the shell of a DAT cartridge in order to prevent insertion of the cartridge in an incorrect orientation. There are a variety of known ways of providing such retaining means e.g. ridges, flexible tongues etc.

Figure 7:
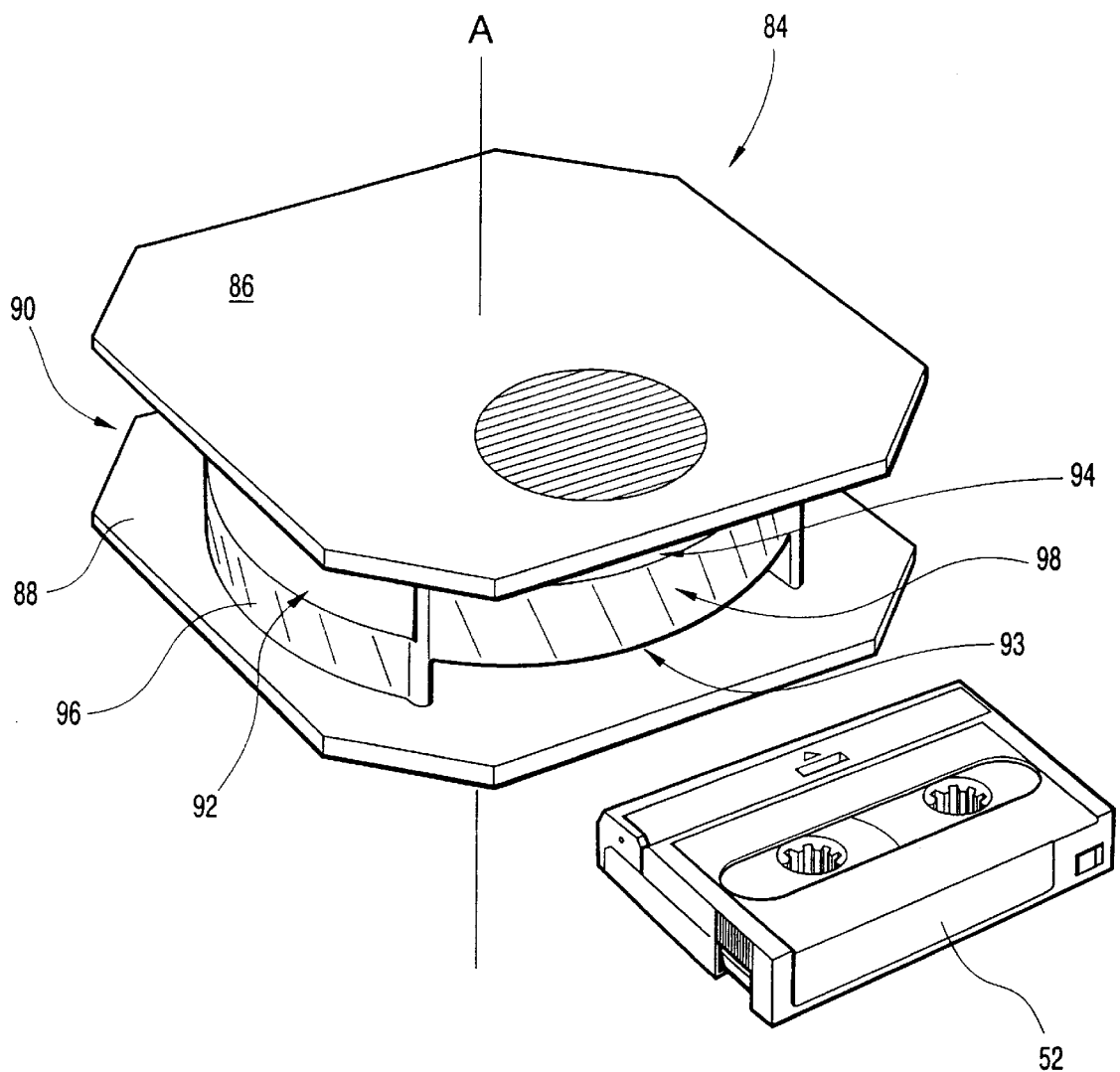
FIG. 7 is a perspective view of an alternative kind of cartridge magazine.

FIG. 7 shows an alternative magazine 84 which is made of moulded plastics material and configured to hold DAT cartridges in staggered formation spaced around a central axis of rotation A. A DAT cartridge 52 is also shown. The magazine 84 comprises top and bottom plates 86 and 88 and a structure 90 defining tape storage slots sandwiched therebetween. On two opposed sides of the magazine 84 there are single central slots, slot 92 being shown in FIG. 7. On the remaining two opposed sides of the magazine 84, there are two spaced slots, which on one side are referenced 93 and 94 in FIG. 7. The upper slot 94 on that side is aligned above the slot 93 and, heightwise, is located above the slot 92. Supporting walls, e.g. 96 and 98, are located adjacent each of the slots. All of the six slots are configured to retain a DAT cartridge securely and to prevent insertion of a DAT cartridge in an incorrect orientation.

The magazine 84 is thus configured to hold six DAT cartridges—two each on two opposed sides and one each on the remaining two opposed sides. In order for there to be access to any DAT cartridge from a single direction the magazine 84 needs to be rotatable through successive quarter turns.

Figure 8:
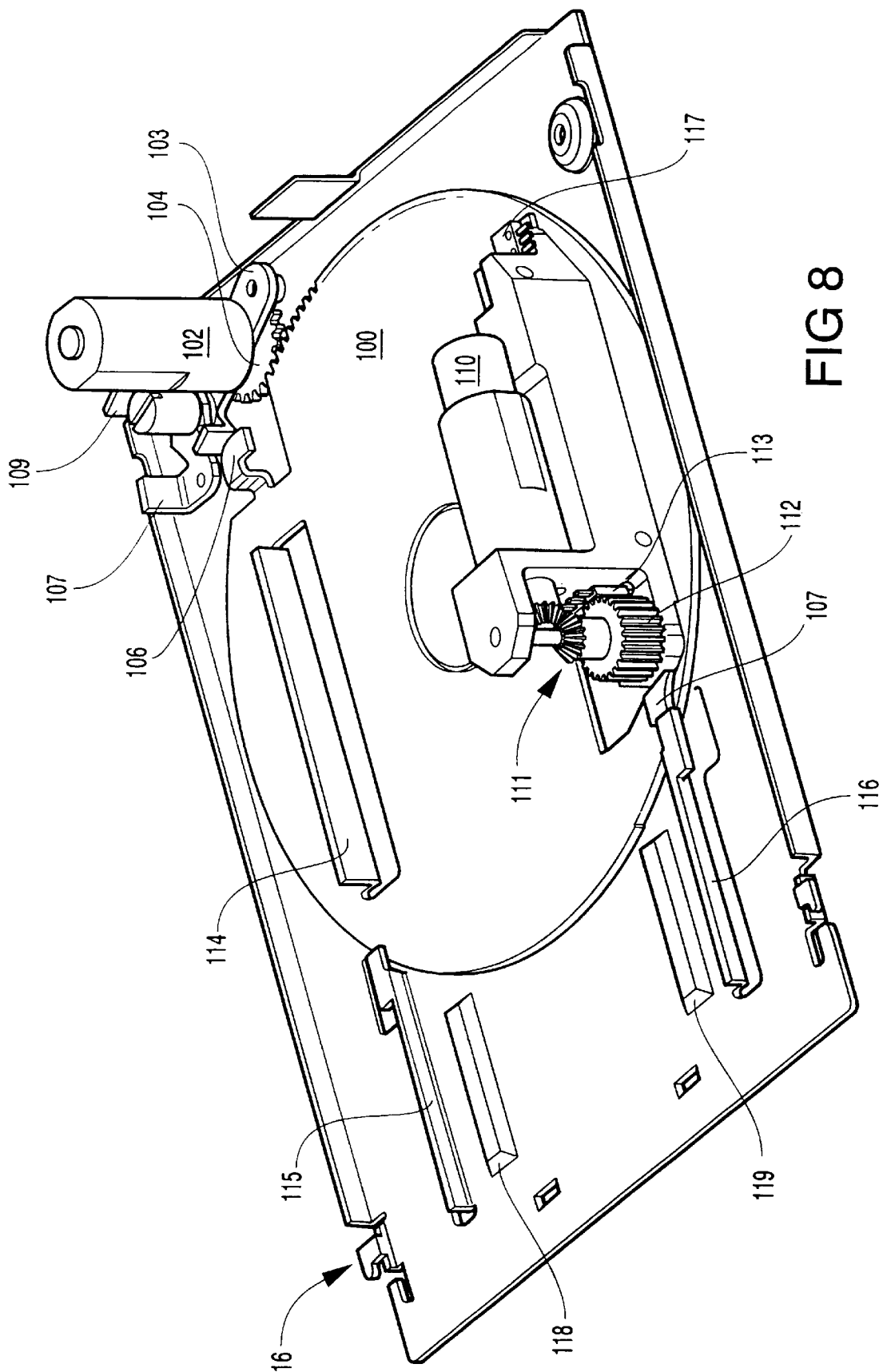
FIG. 8 is a perspective view of the underside of the top plate of the autochanger housing showing the turntable.
Figure 9:
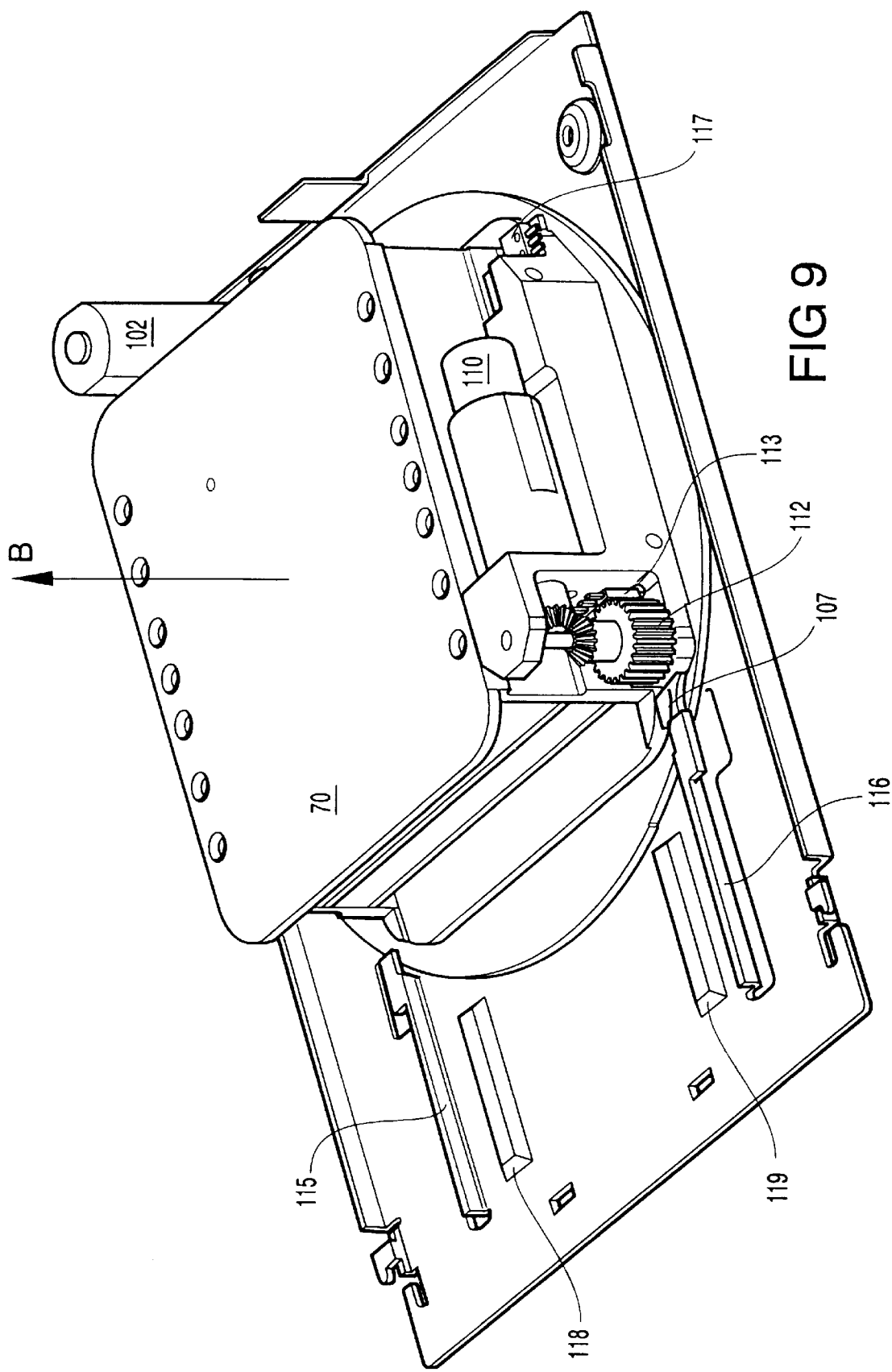
FIG. 9 is a view similar to FIG. 8 and showing a magazine in place on the turntable.

FIGS. 8 and 9 show the underside of the top plate 16 of the housing 12 which is fitted with a turntable 100 provided with teeth around half of its periphery (only some teeth are actually illustrated). When assembled, the turntable 100 is at the top part of the autochanger 10. A motor 102 supported on a mounting block 103 is operable to rotate the turntable 100 about an axis B (FIG. 9) by means of a drive wheel 104 which is driven via an integral clutch by the motor 102 and which engages with the teeth of the turntable 100. The turntable is rotatable through 180°. The turntable 100 has two flags 106 and 107 spaced by 180°. The flags 106 and 107 are configured to deflect a pivot arm 109 which operates a microswitch 108. In this way the angular position of the turntable 100 can be detected. On the nearside of the plate 16 in FIG. 8 is a second motor 110 operable to drive a drive wheel 112, via bevel gears 111 and an integral clutch. This drive wheel engages with the toothed section 82 of the magazine 70 for drawing the magazine 70 into the autochanger 10. The motor 110 is activated in response to a signal from a sensor 113 indicating that the toothed part 82 of the magazine 70 is in engagement with the drive wheel 112. There is also a sensor 117 associated with the turntable 100 for detecting when the magazine 70 is fully inserted onto the turntable 100, as shown in FIG. 9, so as to deactivate the motor 110. The sensors 113 and 117 each have deflectable arms (not shown) which protrude into the path of the magazine 70. There is a side stop 114 mounted on the turntable 100 which, together with the inner side of the mounting block 103, helps to guide the magazine 70 into position on the turntable 100. Also provided are two side stops 115 and 116 on the underside of the top plate 16 to help guide the magazine 70. Protrusions 118 and 119 keep the magazine 70 clear of the plate 16 during insertion so as to clear the edge of the turntable 100 and these also help to keep the magazine 70 appropriately positioned during ejection. Once fully inserted, the magazine 70 is supported on the lid of the drive mechanism 50.

The mechanism for transferring tape cartridges between the magazine 70 and the tape drive mechanism 50 will now be described.

Figure 12:
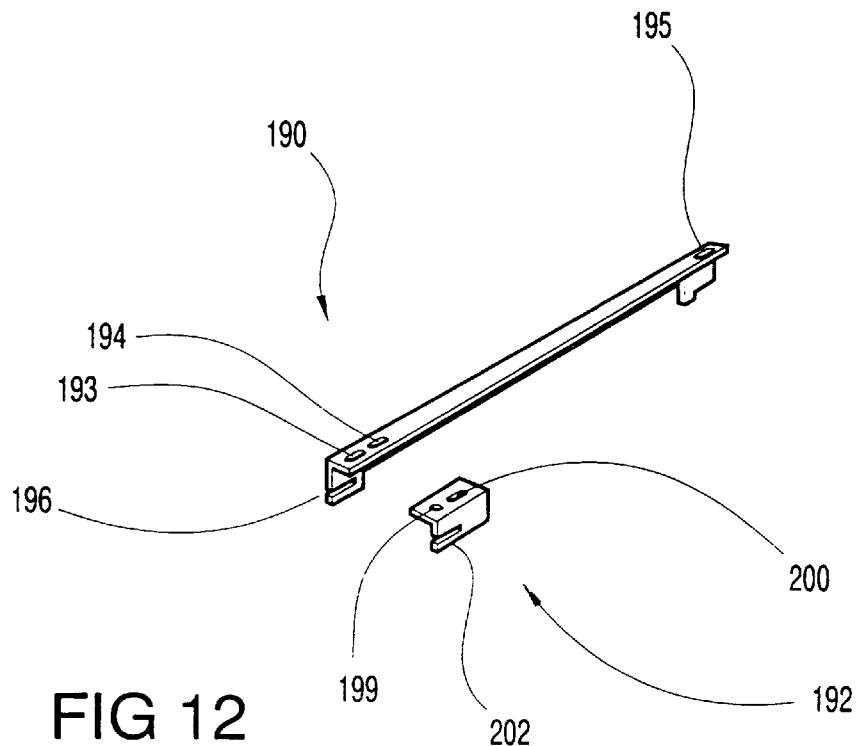
FIG. 12 is a perspective view of connecting rods for operating picker fingers on the picker device of FIG. 11.
Figure 13:
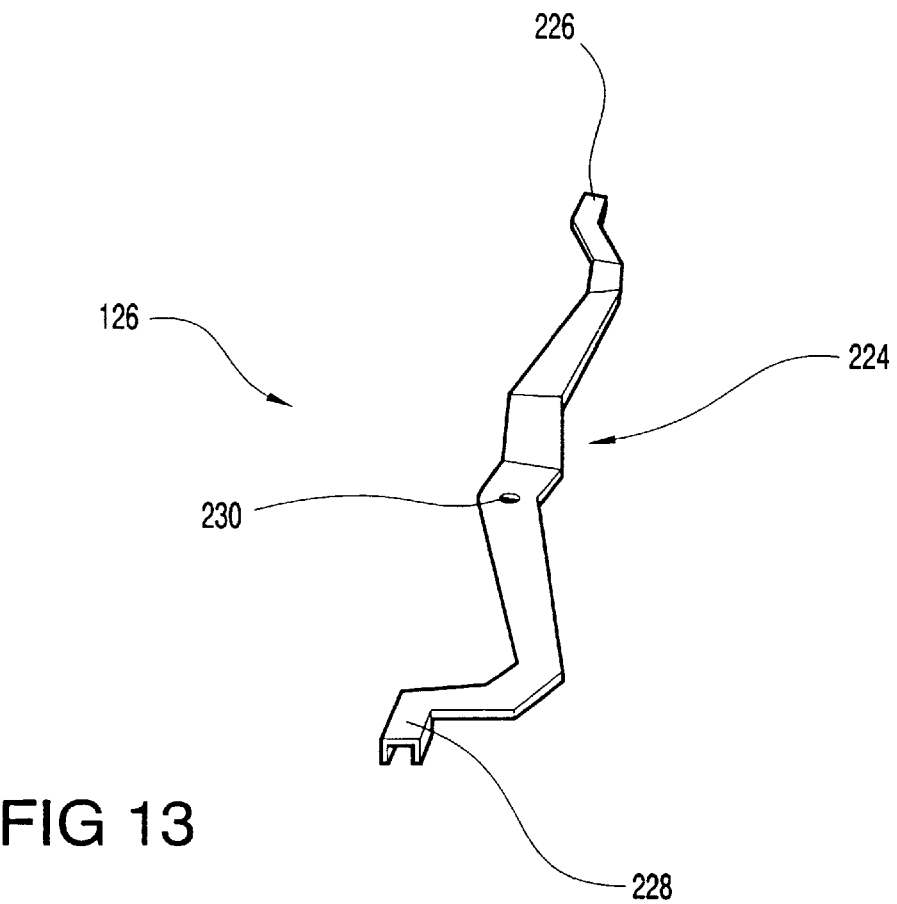
FIG. 13 is a perspective view of a lever which is a part of the tape transfer mechanism shown in FIG. 2.

Referring to FIG. 2, the cartridge transfer mechanism 13 comprises the following components:

a vertically movable platform 120;
a picker device 122;
solenoid-actuated picker disengagement rods 124, which are also shown separately in FIG. 12;

a lever arm 126, which is shown separately in FIG. 13; and two fixed plates 128 and 130 and two slidable plates 132 and 134.

Figure 10:
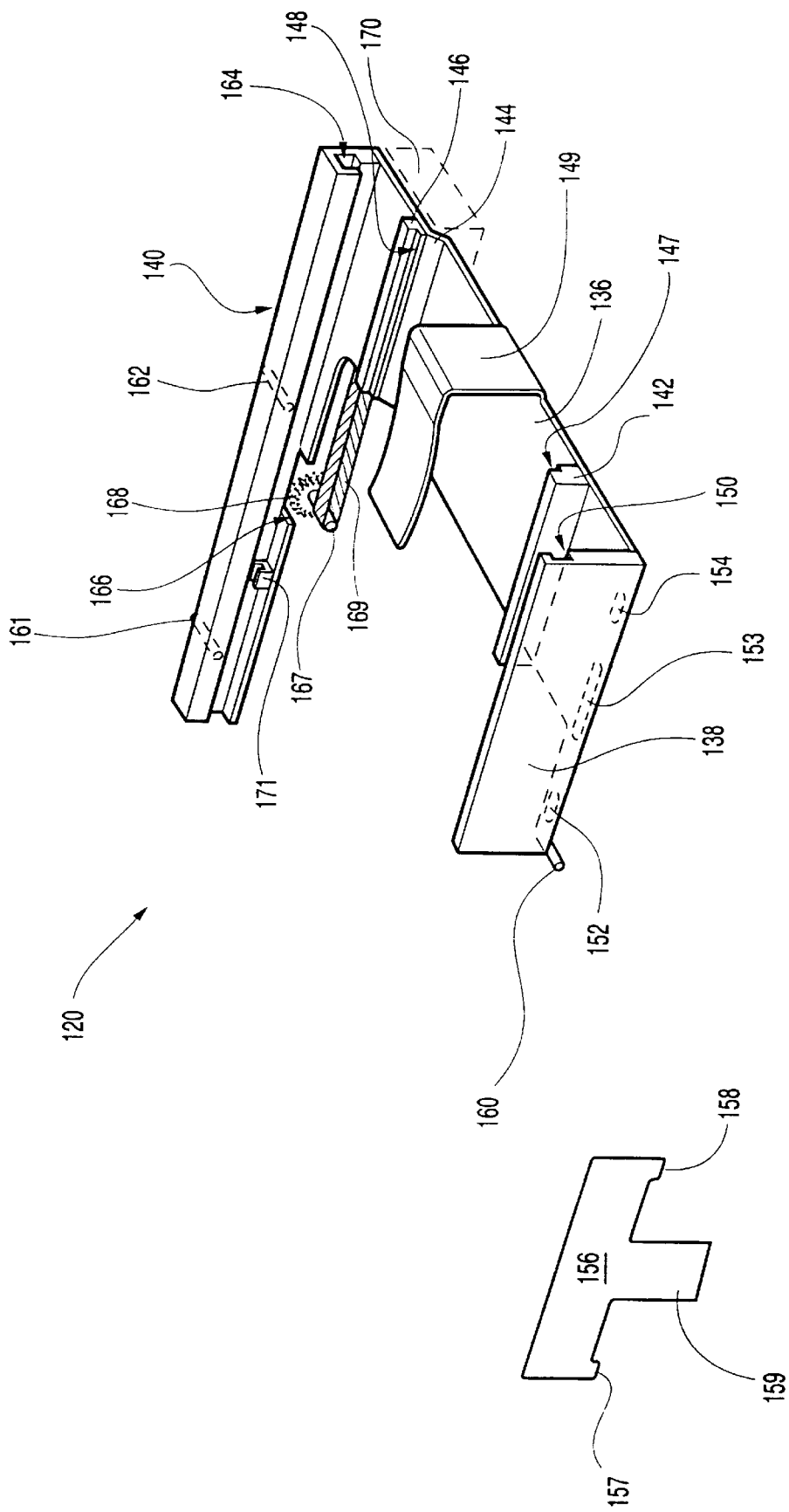
FIG. 10 is a perspective view of the platform of the tape transfer mechanism.

The platform 120 is shown in FIG. 10 and is made from metal coated with a low friction plastics material. The platform 120 comprises a base 136 and side pieces 138 and 140. The base 136 comprises a first guide block 142 and a stepped portion 144 leading to a second guide block 146 which, together with the first guide block 142, defines a receiving area for a DAT cartridge 52. Each of the guide blocks 142 and 146 is recessed to provide a ledge, 147 and 148 respectively for supporting the side edges of a DAT cartridge. There is an upstanding L-shaped spring clip 149 which, in use, bears down on the DAT cartridge to help retain it securely.

The side piece 138 has a channel 150 formed therein. In the base 136, adjacent the side piece 138, are three holes 152-4. These holes are for receiving parts of a T-shaped plate 156 which is also shown in FIG. 10. The plate 156 has lugs 157 and 158 which slot into the holes 152 and 154, and a base 159 which slots into hole 153 so as pivotally to mount the plate 156 on the platform 120. The purpose of the plate 156 will be described below. A connecting pin 160 protrudes sideways beyond the side piece 138 from the underside of the base 136 of the platform 120. There are two similar connecting pins 161 and 162 (shown dotted) which protrude outwardly beyond the side piece 140 on the other side of the platform 120.

The second side piece 140 of the platform 120 is configured to provide a square section channel 164 extending along the length of that side of the base 136. That side of the base 136 extends longitudinally underneath the length of the side piece 140 and comprises a notch 166. The purpose of the notch 166 is to permit a drive wheel 168 (shown dotted) to protrude through so as to engage the picker device 122 of FIG. 11. The drive wheel 168 is driven by a motor 170 attached to the underside of the platform 120. The motor 170 drives a belt 169 which drives a spigot 167 attached to the toothed drive wheel 168. The side piece 140 also comprises a C-shaped sensor 171 which detects the position of the picker device 122 to control the motor 170 accordingly as will be described.

Figure 11:
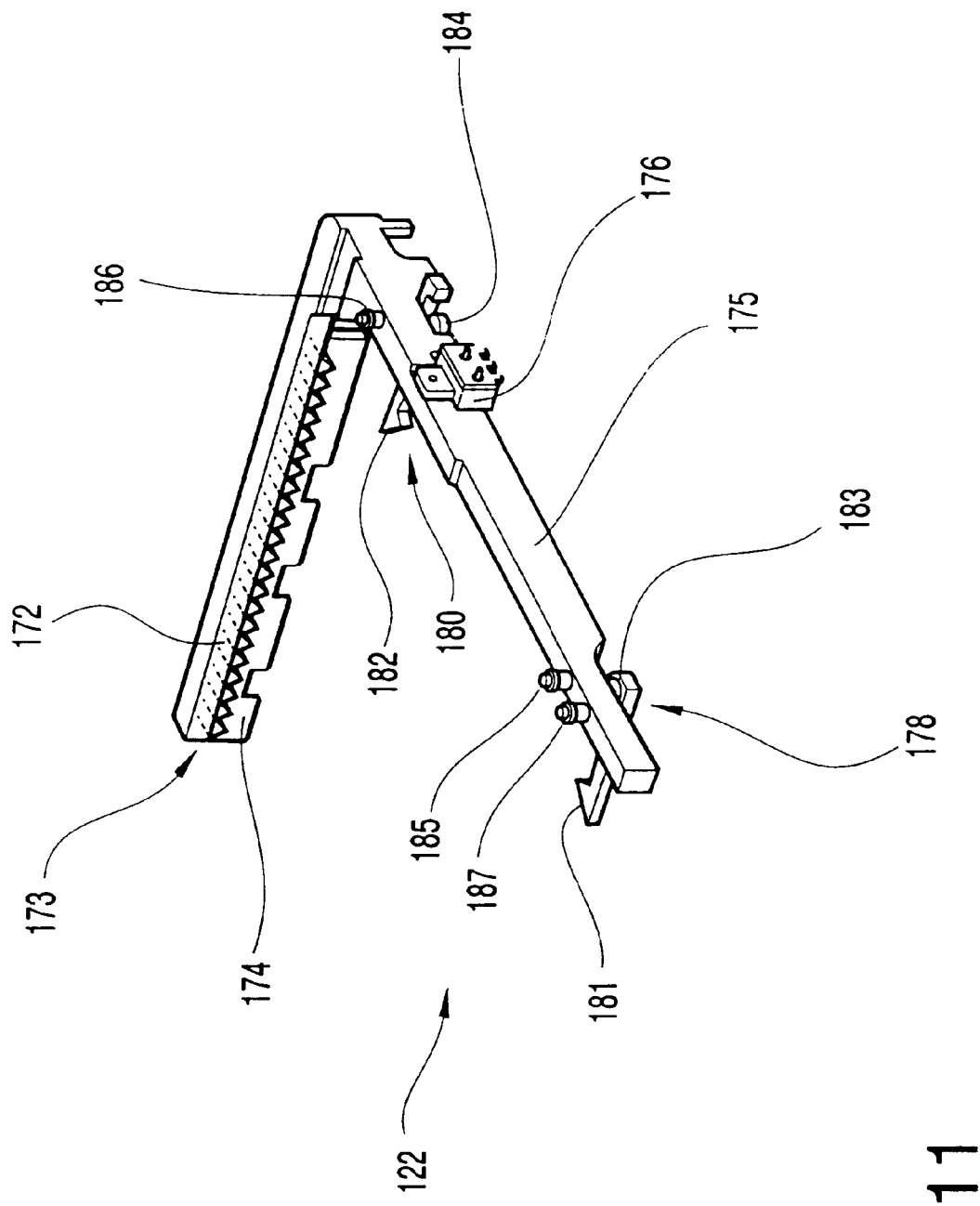
FIG. 11 is a perspective view of a picker device for moving tape cartridges relative to the platform of FIG. 10.

The picker device 122 is shown separately in FIG. 11 and is a metal component coated with a low-friction plastics material and is generally L-shaped. It has a side arm 172 shaped to fit slidably within the channel 164 defined by the side portion 140 of the platform 120, as shown in FIG. 2. The underside of the side arm 172 is shaped to provide a rack 173 (shown dashed) to permit the side arm 172 to be moved slidably within the channel 164 by the motor 170. The side arm 172 has a notched skirt 174 depending therefrom and the notches are detectable by the sensor 171 on the side piece 140 of the platform 120 to provide information concerning the position of the picker device 122 on the platform 120. A front arm 175 of the picker device 122 extends across the width of the base 136 of the platform 120 and comprises a sensor switch device 176 which has a mechanical microswitch extending forwardly through the front arm 175 so as to detect when a DAT cartridge is abutting the front arm 175. There are two picker fingers 178 and 180 pivotally mounted on the front arm 175. Each of the picker fingers 178, 180 has a generally triangular head 181, 182 designed to engage in the notches 75 on the sides of a DAT cartridge 52 (of the kind which does not have a wall section 518 at the rear of each notch—see FIG. 16a). Each of the picker fingers 178, 180 is spring-biassed inwardly by means of a torsion spring around its respective pivot mounting 183, 184. This feature has the advantage of enabling the picker device 122 positively to grip a DAT cartridge as will be described. There are pins 185 and 186 forming part of the mountings for the picker fingers 178, 180 and one further pin 187 on the front arm 175.

The rods 190 and 192 of FIG. 12 form part of a mechanism for disengaging the picker fingers 178 and 180 from a DAT cartridge. The longer rod 190 is L-shaped in section and comprises three slots 193, 194 and 195 which fit over the pins 185,186 and 187 on the front arm 175. The rod 190 has a finger 196 for receiving a compression spring (not shown). The shorter rod 192 is also L-shaped in section, comprises two slots 199, 200 which fit over the pins 185 and 187 and has a finger 202 also for receiving a compression spring (not shown). The slots 193, 194, 195, 199 and 200 in the rods 190 and 192 are large enough to allow the rods 190 and 192 to slide a small distance relative to the front arm 175 of the picker device 122. When assembled, the horizontal parts of the rods 190 and 192 sit on the front arm 175 of the picker device 122 with their vertical parts positioned on opposite sides of the front arm 175. In its normal position, the upper part of the pivotable plate 156 (FIG. 10) abuts the two compression springs on the fingers 196 and 202. The far end of the rod 190 is adjacent the head 182 of the picker finger 180 and the far end of the rod 192 is adjacent the mounted end of the picker finger 178 i.e. behind the pivot point.

On actuation of a solenoid (not shown) mounted on the underside of the platform 120, the base 159 of the plate 156 is deflected outwardly causing the plate 156 to pivot so that its upper part compresses the springs on the fingers 196 and 202 and moves the rods 190 and 192 a small distance relative to the front arm 175 of the picker device 122. This causes the far end of the rod 190 to abut the picker finger 180 adjacent the head 182 thereof thereby pivoting it outwardly. The rod 192 moves the end of the picker finger 178 remote from the head 181, thereby also pivoting that finger outwardly. In this way, actuation of the solenoid causes the picker fingers 178 and 180 to splay outwardly, e.g. to release their hold on a DAT cartridge. The arrangement is such that the picker fingers 178 and 180 splay outwardly whenever the solenoid is actuated, whatever is the horizontal position of the picker device 122 relative to the platform 120. This arrangement for deflecting the picker fingers 178 and 180 is advantageous in that it permits the solenoid to be mounted on the platform 120, rather than on the picker device 122, so that the solenoid and associated wiring do not have to be moved horizontally. It uses a single member, the plate 156, for effecting the movement of both of the picker fingers 178 and 180 thereby saving on parts.

As noted above, the picker device 122 shown in FIG. 11 is intended for use with DAT cartridges which do not have any wall section obstructing the rear of the notch 75, and the subsequent description of the operation of the autochanger 10 therefore assumes the use of such cartridges. An alternative picker device which may be used with cartridges which do have a wall section in the notch is described hereinafter with reference to FIGS. 17 to 25.

Referring now to FIG. 2, attached to the sides 18 and 20 of the housing 12 of the autochanger 10 are fixed plates 128 and 130. The plate 128 comprises two vertical slots 200 and 202 into which engage the connecting pins 161 and 162 on the platform 120 (FIG. 10). The plate 130 has a single vertically extending slot 204 in which engages the connecting pin 160 on the platform 120. The plate 130 is cut away to form a generally triangular shape, simply to reduce weight. Adjacent to and outside the plate 128 is a slidable plate 132 which comprises two parallel staircase grooves 206 and 208 which define four vertical positions a, b, c and d for the platform 120. A rack 211 is provided at the base of the plate 132 and this is engaged by a drive wheel 212 driven directly by a motor 213 positioned at the base of the far rear corner of the housing 12. Another slidable plate 134 is positioned adjacent and inside the fixed plate 130 on the other side of the autochanger 10. The slidable plate 134 comprises a single staircase groove 214 which is oriented oppositely to the staircase grooves 206 and 208 but which also defines the same four vertically-spaced positions a, b, c, and d for the platform 120. The top part of the slidable plate 134 has two parallel flanges 218 and 219 which are notched. The flange 218 comprises nine notches 223–231 as indicated (apart from notch 231 which is obscured) in FIG. 14, which shows full details of the slidable plate 134. In FIG. 2 the forward and bottom edges of the slidable plate 134 are not shown in any detail.

Figure 14:
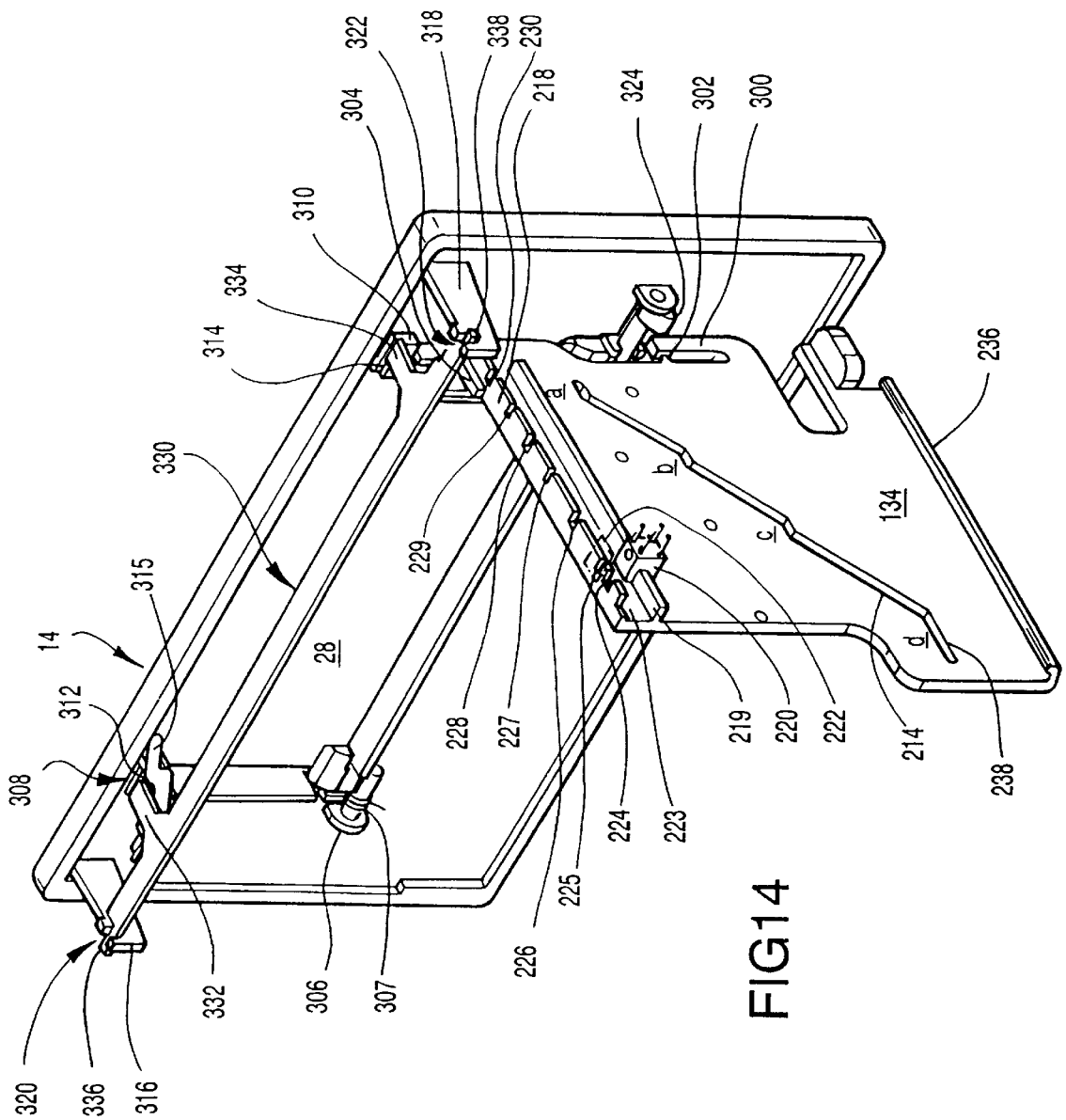
FIG. 14 is a perspective view showing a door locking arrangement.

Referring to FIG. 14, there are two C-section optical sensors 220 and 222 mounted in parallel on the printed circuit board 49 and positioned to detect the passage of the flanges 218 and 219 as the plate 134 slides. The sensor 220 is shown in detail in FIG. 14; the position of the sensor 222, which is the same type as the sensor 220, is shown dotted. The flange 219 has a single notch 232 (FIG. 2) which defines the parked position of the platform 120. The notch 232 is obscured by the sensor 220 in FIG. 14.

The notches 223–231 in the flange 218 define the following positions of the platform 120 and states of the door 28:

| | | |
|---|---|---|
| notch 223 | platform parked (position d); | door open |
| notch 224 | platform parked (position d); | door unlocked |
| notch 225 | platform parked (position d); | door locked |
| notch 226 | platform moving between positions d and c; | door locked |
| notch 227 | platform in position c; | door locked |
| notch 228 | platform moving between positions c and b; | door locked |
| notch 229 | platform in postion b; | door locked |
| notch 230 | platform moving between positions b and a; | door locked |
| notch 231 | platform in position a; | door locked. |

Thus the sensors 220 and 222 can be used to control the motor 213 and hence the height of the platform 120.

The plates 130 and 134 are slidably engaged at their bottom edges. The bottom edge of the fixed plate 130 is configured to provide a downwardly facing channel member 234 (FIG. 2) into which slidably fits an upturned lower edge 236 of the slidable plate 134 (FIG. 14).

The lever arm 126, which is shown individually in FIG. 13, is made of steel. The lever arm 126 is stepped at 224 and has profiled ends 226 and 228 designed for attachment to the lower front edges of the slidable plates 132 and 134 as shown in FIG. 2. The lever arm 126 is pivotally attached to the base panel 24 of the housing 12 at a pivot point 230. When the motor 213 causes the plate 132 to slide, this causes the lever arm 126 to pivot so as to cause the slidable plate 134 to slide simultaneously in the opposite direction. As will be appreciated, the sliding of the plates 132 and 134 means that the staircase grooves 206, 208 and 214 force the connecting pins 160, 161 and 162 to ride upwardly in the vertical slots 200, 202 and 204. The sliding movement of the slidable plates 132 and 134 is controlled using the sensors 220 and 222 so that the platform 120 is moved vertically to the desired one of the four possible positions a, b, c and d defined by the staircase grooves 206, 208 and 214.

It is the movement of the plate 134 which also controls the locking, unlocking and opening of the door 28 in the front panel 14 of the housing 12. As shown in FIG. 14 for the groove 214, the lowermost parts of the staircase grooves 206, 208 and 214 each have a horizontal portion 238 allowing some sliding of the plates 132 and 134 without disturbing the platform 120 from its parked position. There is a locking member 330 which fits over the inside of the top of the door 28 and which, in its rest position, locks the door 28. The locking member is designed so that when the plate 134 moves forward whilst the platform 120 is in the parked position, the plate 134 lifts the locking member so as to unlock the door. Further forward movement of the plate 134 causes the door 28 automatically to open.

FIG. 14 shows the slidable plate 134 and the front panel 14. The plate 134 comprises a flexible arm 300 which can flex onto and away from a stop 302. The uppermost forward corner of the plate 134 comprises a cam 304.

The door 28 in the front panel 14 opens inwardly and closes about a hinge 306. The door 28 is biassed shut by a torsion spring 307 on the hinge 306. Attached to the inside top part of the door 28 are blocks 308 and 310 which each define a rearward facing ledge 312 and 314. A lever 315 is deflected on opening of the door 28 and activates the sensor 29 mentioned previously with reference to FIG. 1. At either side of the door 28 and mounted on the inside of the front panel 14 are supports 316 and 318 which define upwardly facing slots 320 and 322. The hinge 306 extends sideways to beyond the flexible arm 300 and carries a cam lobe 324.

The elongate locking member 330 has feet 332 and 334 which rest on the ledges 312 and 314 of the blocks 308 and 310 on the door 28. At the ends of the locking member 330 are lugs 336 and 338 which rest in the slots 320 and 322 of the supports 316 and 318. In the position shown in FIG. 14 the front of the locking member 330 is angled downwardly so that the feet 332 and 334 are lower than the main body of the locking member 330.

In the position shown in FIG. 14 the door 28 is locked because any attempt to push the top of the door 28 inwardly will be prevented by the locking member 330 engaging the blocks 308 and 310. Forward movement of the plate 134 causes the cam 304 to engage the underside of the right hand end of the locking member 330 so that it pivots about the lugs 336 and 338 and the feet 332 and 334 lift up off the ledges 312 and 314, thus permitting opening of the door 28. Further forward movement of the plate 134 causes the flexible arm 300 to engage the cam lobe 324 and turn it downwardly thereby opening the door 28. The flexible arm 300 flexes back against the stop 302 when the door 28 is open.

Reversing the movement of the plate 134 takes the flexible arm 300 out of engagement with the cam lobe 324 thereby allowing the door to be closed by the force of the spring 307. Further rearward movement of the plate 134 takes the cam 304 out of engagement with the underside of the locking member 330 thereby allowing it to pivot back under the influence of gravity to the locking position shown in FIG. 14.

FIG. 15 is a controller block diagram for the autochanger of the present invention. The components are labelled with the reference numbers used for them in the preceding description. A microprocessor 248 receives signals from the various sensors and switches and controls the various motors accordingly. The circled numbers on the connecting lines in FIG. 15 indicate the number of signal channels for the connection. The microprocessor 248 communicates with the firmware 64 of the tape drive mechanism 50 via the interface 69. Item 250 is a spare sensor for detecting the angular position of the turntable 100. The components which are mounted on the printed circuit board are located within the dashed lines in FIG. 15. These comprise:

the microprocessor 248;

the sensors 220 and 222;

an eight-to-one selector 252 for sequentially supplying signals to the microprocessor 248 from eight switches connected to the selector; amplifiers 254;

a reset circuit 256;

a jam detection circuit 258 which senses when a motor is jammed;

motor drivers 260 and 262; and a solenoid drive transistor 264.

The operation of an autochanger according to the present invention will now be described in the context of backing-up data from a host computer. The autochanger 10 can be used in automatic mode in which case all of its commands come from the host computer and the user interacts with the host computer to control the back-up operation. Of course the host computer may be programmed to execute a back-up operation automatically without user intervention. Alternatively, the autochanger can be used in manual mode in which a user utilises the buttons on the front panel 14 as shown in FIG. 1. It is manual mode which will now be described.

Prior to insertion of a magazine, the door 28 of the autochanger is closed but unlocked, i.e. the plate 134 is positioned so that the notch 224 is aligned with the sensor 222.

Initially the user loads the magazine 70 with six DAT cartridges and inserts the magazine 70 through the door 28 of the front panel 14 of the autochanger 10. The DAT cartridges are notionally numbered according to their position in the magazine 70 with numbers one to three being positioned from top to bottom of the rear of the magazine 70, i.e. the part of the magazine 70 which is first inserted in the autochanger, and numbers four to six being positioned from top to bottom of the front of the magazine. Opening of the door 28 is sensed by sensor 29 which primes the system to prepare for insertion of the magazine 70. At this stage the plate 134 is positioned so that the door 28 is unlocked. Once the magazine 70 is inserted far enough to trigger the sensor 113 (FIG. 8) this activates the motor 110 which causes the drive wheel 112 to rotate and, in engagement with the toothed section 82 of the magazine 70, draws the magazine 70 onto the turntable 100. When the magazine 70 is fully inserted onto the turntable 100 this is detected by the sensor 117 which deactivates the motor 110. During loading of the magazine the LED 31 is lit. Once the magazine 70 is loaded, the door 28 is shut by the force of the spring 307. The motor 213 is then activated to slide the plate 134 rearwardly so as to lock the door 28. At this stage a preload sequence is performed to check for the presence of DAT cartridges in the magazine 70. The preload sequence proceeds as follows under the control of the microprocessor 248:

activation of the motor 213 to cause the plates 132 and 134 to slide so that the connecting pins 160, 161 and 162 on the platform 120 are moved upwardly in the vertical slots 200, 202 and 204 by virtue of the movement of the staircase grooves 206, 208 and 214 past these vertical slots. Once the platform 120 has reached its topmost position a, as detected by the sensor 222, the motor 213 is deactivated;

activation of the motor 170 to move the picker device 122 horizontally relative to the platform 120 and towards the slot in the magazine 70 which houses cartridge number four. As the picker device 122 moves rearwardly, the solenoid mounted underneath the platform 120 is activated to splay the picker fingers 178 and 180 outwardly as previously described. The picker device 122 is moved further rearwardly until its front arm 175 abuts the leading edge of the DAT cartridge. This is sensed by the sensor device 176 on the front arm 175 and a signal is generated to deactivate the motor 170 to halt further rearward movement of the picker device; having checked the presence of cartridge number four the motor 170 is activated to reverse the movement of the picker device 122 relative to the platform 120. Once the picker fingers 178 and 180 are clear of the DAT cartridge the solenoid is deactivated and the picker fingers 178 and 180 return to their normal positions. The reverse movement continues until signals from the sensor 171 indicate that the picker device has been withdrawn fully onto the platform 120 and the motor 170 is deactivated;

activation of the motor 213 to reverse the sliding movement of the plates 132 and 134 so as to lower the platform 120 to position b;

movement of the picker device 122 to check the presence of cartridge number five in the manner described above for cartridge number four; activation of the motor 213 to lower the platform 120 to position c;

movement of the picker device 122 to check the presence of cartridge number six in the manner described above for cartridge number four;

activation of the motor 102 to rotate the turntable 100 and the magazine 70 through 180°. When the sensor 108 detects that the turntable has rotated through 180°, the motor 102 is deactivated;

repetition of the above procedure in order to check the presence of cartridges numbers one, two and three.

When the preload sequence is complete, the LCD 34 indicates that a magazine is present with all six slots occupied by DAT cartridges.

The user then presses the button 36 to select a specific DAT cartridge, cartridge number five for example. Pressing the button 36 causes the LCD 34 to cycle through the cartridge options one to six and pressing the button 36 again when the cartridge option number five is displayed selects that particular cartridge. The user then presses button 38 to cause cartridge number five to be loaded into the tape drive mechanism 50. Depression of the button 38 causes the following sequence of events to occur, under the control of the microprocessor 248:

activation of the motor 102 so as to rotate the turntable 100 through 180°. When the optical sensor 108 detects that the turntable 100 has rotated through 180° the motor 102 is deactivated;

activation of the motor 213 to cause the plates 132 and 134 to slide so that the connecting pins 160, 161 and 162 on the platform 120 are moved upwardly in the vertical slots 200, 202 and 204 by virtue of the movement of the staircase grooves 206, 208 and 214 past these vertical slots. The motor 213 is deactivated in response to signals from the sensor 222 which indicate when the platform has reached position b in the staircase grooves 206, 208 and 214;

activation of the motor 170 to move the picker device 122 horizontally relative to the platform 120 and towards the slot in the magazine 70 which houses cartridge number five. The picker device 122 moves rearwardly relative to the platform 120 and, at the appropriate time, as sensed by the sensor 171, the solenoid on the underside of the platform 120 is activated to splay the picker fingers 178 and 180 so that these clear the edges of the DAT cartridge. The motor 170 is deactivated in response to signals from the sensor switch assembly 176 which indicate when the DAT cartridge abuts the front arm 175 of the picker device 122. Deactivation of the solenoid allows the picker fingers 178 and 180 to spring into the notches 75 on the side edges of the DAT cartridge 52 thus providing a positive engagement between the picker device 122 and the DAT cartridge 52. The motor 170 then reactivates to reverse the movement of the picker device 122 relative to the platform 120 so as to withdraw the DAT cartridge from the magazine 70. The reverse motion of the picker device 122 continues until signals from the sensor 171 indicate that the picker device 122 has been withdrawn fully onto the platform 120, causing the motor 170 to be deactivated;

activation of the motor 213 to reverse the sliding movement of the plates 132 and 134 in order to lower the platform 120 back to its parked position opposite the drive mechanism 50;

activation of the motor 170 to slide the picker device 122 relative to the platform 120 so as to push the DAT cartridge towards the drive mechanism 50;

at the appropriate point in the movement of the picker device 122, as sensed by the sensor 171 on the side piece 140 of the platform 120, the solenoid mounted underneath the platform 120 is activated to cause the picker fingers 178 and 180 to splay, to release their hold on the DAT cartridge and to allow the cartridge to be drawn into the drive mechanism 50 by its cartridge loading mechanism. The LCD 34 on the front panel 14 then displays the number '5' to indicate that cartridge number five is presently loaded into the drive mechanism 50. It also indicates whether the DAT cartridge is write-protected (as sensed by the drive mechanism 50). The drive mechanism 50 then writes data from a host computer to the DAT cartridge and the progress of data transfer is indicated in the LCD 34. The LCD 34 also indicates whether the drive mechanism 50 is performing data compression. Once the DAT cartridge is full the drive mechanism 50 automatically disgorges the DAT cartridge and the following sequence of events occurs, again under the control of the microprocessor 248:

activation of the motor 170 to move the picker device 122 relative to the platform 120 and towards the drive mechanism 50 and opening of the picker fingers 178 and 180 so that the picker fingers 178 and 180 again engage the notches in the DAT cartridge. In the manner described above, the motion of the picker device 122 is then reversed to withdraw the DAT cartridge onto the platform 120;

activation of the motor 213 to slide the plate 132 forwardly (which causes the plate 134 to slide rearwardly by virtue of the lever 126) so as to raise the platform 120 until it reaches position b;

further movement of the picker device 122 relative to the platform 120 so as to push the DAT cartridge towards the magazine 70 and to return it to its slot in the magazine 70, accompanied by activation of the solenoid to cause the picker fingers 178 and 180 to release their hold on the DAT cartridge once it is safely in its slot in the magazine 70.

In manual mode the autochanger will then load the remaining cartridge numbers six, one, two, three and four, in that order, to continue the back-up operation. That is, in manual mode, the back-up operation starts with the cartridge selected by the user and then proceeds automatically through the remaining cartridges in sequence.

When the back-up operation is completed, the user presses the button 40 to cause the magazine 70 to be ejected from the autochanger 10. This causes the following sequence of events:

- if required, rotation of the turntable 100 to position the magazine 70 correctly for ejection from the autochanger;
- actuation of the motor 213 to move the plate 134 along the horizontal portion 238 of the staircase groove 214 whilst the platform 120 is in its parked position so as to unlock and automatically open the door 28 as previously described;
- actuation of the motor 110 to drive the drive wheel 112 in the reverse direction so as to slide the magazine 70 off the turntable 100 until it juts out of the door 28 from where it can be retrieved by the user;
- actuation of the motor 213 to reverse the plate 134 to the 'door unlock' position;
- after removal of the magazine 70 by the user, the door 28 is then closed by the force of the spring 307.

It will be appreciated that many variations on the above described sequence of events are possible if increased user interaction were permitted.

It will be understood that the embodiment just described would require modification in order to operate with a magazine 84 of the type described with reference to FIG. 7. Specifically, the turntable 100 would need to be rotatable through successive quarter turns in order for all of the cartridges to be accessible from one direction. A different arrangement other than the toothed drive wheel 112 would need to be provided for helping to retract and eject the magazine e.g. two sets of aligned teeth provided on the top and bottom plates 86 and 88 of the magazine 84 for co-operating with two drive wheels in the autochanger 10. Such changes are within the capability of the average person skilled in the art.

Another alternative is for the media items, such as DAT cartridges, to be individually insertable into a rotatable holder mounted within the autochanger rather than having a removable magazine. An example of such an embodiment can be envisaged by imagining either of the magazines described above to be permanently mounted within the autochanger and rotatable by the turntable, and the user being required manually to insert individual DAT cartridges through the slot 26 in the front panel 14 of the autochanger 10 and likewise manually to remove individual DAT cartridges.

An alternative form of picker device which may be substituted for the picker device 122 shown in FIG. 11, and which can be used with DAT cartridges having a wall section 518 at the rear of the notch 75, is shown in FIGS. 17 to 25. Parts of this alternative picker device which correspond to parts of the picker device of FIG. 11 have like reference numerals, but with the addition of a suffix a.

Referring to FIGS. 17 and 18, the alternative picker device 122a may be made for example of plastic or metal, and is generally L-shaped, with a side arm 172a arranged to fit slidably on the side of the platform 120 (FIG. 2). The side arm 172a has a clamp 188 for attachment to the drive belt 169 (FIG. 10), to permit the side arm 172a to be moved slidably over the platform 120 by the motor 170 (FIG. 10), the drive wheel 168 and rack 173 being omitted in this case. A wall 174a extending along the upper side of the side arm 172a (and corresponding in function to the skirt 174 in FIG. 11) has notches which are detectable by a C-shaped sensor 171a mounted on the platform 120, to provide information concerning the position of the picker device 122a on the platform 120 for controlling the drive belt motor.

A front arm 175a of the picker device 122a extends across the width of the platform 120 and carries two picker fingers 178a and 180a. These picker fingers are pivotally mounted on the arm 175a for rotation about axes parallel to one another and transverse to the direction of movement of the picker device 122a over the platform 120. Each picker finger 178a, 180a is spring-biassed inwardly (i.e. towards the other picker finger) by means of a torsion spring around its respective pivot pin 185a, 186a. These torsion springs also apply a downward bias to the picker fingers 178a, 180a, in order to compensate for the effects of component tolerances on the relative positions of the picker fingers and a DAT cartridge. Two rods 190a and 192a extend along the front arm 175a from its free end, remote from the side arm 172a. The rod 190a is the longer of the two and reaches to the picker finger 180a adjacent the side arm 172a; the other rod 192a is shorter and reaches to the picker finger 178a.

The picker finger 178a is shown in greater detail in FIGS. 19 to 23; the other picker finger 180a is a mirror-image copy. Referring to FIGS. 19 to 23, the picker finger 178a has a hub 400 with a central hole 402 to receive the pivot pin 185a and inner and outer peripheral holes 404 and 406. An arm 408 extends tangentially from the hub 400, parallel to a line (referenced 409 in FIG. 20) joining the holes 402 to 406, and carries an upwardly extending post 410 at its end. An upper tooth 412 extends transversely from the top of the post 410, towards the line 409, and a lower tooth 414 extends parallel to the tooth 412 from the foot of the post 410.

The upper tooth 412 has a downwardly-directed face 416 on its lower side, inclined upwards and outwards (i.e. away from the post 410). The lower tooth 414 has an upwardly-directed face 418 on its upper side, inclined downwards and outwards, a front or outer face 420 (i.e. facing away from the hub 400) inclined outwards and backwards (towards the hub 400) and a vertical rear face 422 transverse to the arm 408. These three faces 418, 420 and 422 intersect to form a wedge-shaped end 424. As is best shown in FIG. 23, the upper and lower inclined faces 416 and 418, on the upper and lower teeth 412 and 414 respectively, define between them an opening which tapers in towards the post 410.

The picker finger 178a is mounted on the front arm 175a with its hub 400 in a recess in the arm and its arm 408 extending out on the same side as the side arm 172a, and its teeth 412 and 414 facing towards the side arm 172a. The mirror-image picker finger 180a is mounted similarly, with its teeth facing away from the side arm 172a and thus towards the teeth of the picker finger 178a.

The rod 190a on the front arm 175a has a downward projection at its end adjacent the picker finger 180a and this projection fits into the inner peripheral hole 404 on the hub 400 of the picker finger (i.e. the hole on the same side of the hub as the arm 408). The shorter rod 192a has a similar downward projection which fits into the outer peripheral hole 406 on the hub of the picker finger 178a (i.e. the hole on the other side of the hub from the arm 408). If the ends of the rods 190a and 192a at the free end of the front arm 175a are urged towards the side arm 172a, they act to rotate the picker fingers 178a and 180a away from one another around their respective pivot pins, so that they splay outwardly, e.g. to release their grip on a DAT cartridge. The operation of the rods 190a and 192a is by way of the pivoted plate 156 and the solenoid under the platform 120, as described above with reference to FIGS. 10 and 11.

When operation of the autochanger requires gripping of a DAT cartridge (for its insertion into or extraction from a magazine or the tape drive mechanism), the picker device 122a is moved rearwards relative to the platform 120 towards the DAT cartridge. At the appropriate point during this motion, as sensed by the sensor 171a, the rods 190a and 192a are actuated to splay the picker fingers 178a and 180a so that they clear the rear face 516 of the DAT cartridge. When the front arm 175a abuts the rear face 516 of the cartridge, the motion of the picker device 122a is halted.

The rods 190a and 192a are allowed to return to their rest positions, in turn allowing the picker fingers 178a and 180a to spring against the rear side portions of the cartridge. As shown in FIGS. 24 and 25, the inclined face 416 on the upper tooth 412 of each picker finger engages the upper edge 520 of the adjacent cartridge side wall (shown in dashed line); the inclined face 418 on the lower tooth 414 engages the lower edge of the wall section 518 (if this wall section is present). In addition, the rear face 422 on the lower tooth 414 slides in front of the front face of the rib 514 which forms the rear of the channel 510. Thus, when the picker device 122a is moved forwards relative to the platform 120, to withdraw the cartridge from a magazine or from the tape drive mechanism 50, the lower tooth 414 engages positively with the rib 514, providing a secure, reliable grip on the cartridge.

If the cartridge is being removed from the tape drive mechanism 50, the sliding cover 506 of the cartridge will be in its open position, with its rear edge 508 adjacent the rib 514. Accordingly the space available for insertion of the lower tooth 414 of the each picker finger 178a, 180a will be restricted. However, the wedge-shaped end 424 of this tooth ensures that the tooth can enter this restricted space sufficiently for the rear face 422 of the tooth to engage reliably with the rib 514.

After the cartridge has been withdrawn from the magazine or tape drive mechanism by the picker device 122a, its motion is halted and the platform 120 is moved up or down as appropriate into proximity with the intended destination for the cartridge. The picker device 122a is then moved rearwards relative to the platform 120 once more, to push the cartridge into the tape drive mechanism 50 or the magazine as appropriate. When the cartridge has reached the correct position, as indicated by the sensor 179 a, the rods 190a and 192a are actuated again to splay the picker fingers 178a and 180a and release their grip on the cartridge.

Various modifications can be made to the picker device 122a just described. Thus, for example, the inclined faces 416 and 418 could be arcuate rather than planar. Instead of both these faces on a picker finger being inclined relative to the DAT cartridge, one or other face could be generally parallel to the top and bottom of the cartridge shell.

It should be understood that the present invention is not limited to an autochanger for DAT cartridges but may be used for other types of tape cartridge or cassette. The number of cartridges or cassettes able to be stored by the autochanger at any one time will depend on their size and the particular form factor within which the autochanger fits.

Whilst the specific embodiment described involves the storage area for media items being above the drive mechanism this is not essential. Alternatively, the drive mechanism could be housed in the upper part of the autochanger with the storage data area for the media items being in the lower part.

What is claimed is:

1. Apparatus for storing plural items of recording media and for transferring the plural media items to and from a mechanism for reading and/or writing to the media items, said apparatus comprising:

a storage area for storing a plurality of the media items so that there are a plurality of said media items simultaneously spaced around a common axis of rotation for said media items and there are a plurality of said media items simultaneously spaced along said axis, said mechanism being fixedly located adjacent to said storage area and displaced from said storage area along said axis so that said axis passes through said reading and/or writing mechanism;

means for rotating the stored media items as one body about said axis so as to permit access to any of the media items from only one direction transverse to said axis and;

transfer means operable to collect said media items from said one direction and to transfer said media items between the storage area and said mechanism, wherein the apparatus is adapted to receive a magazine carrying the media items and the rotating means is operable to rotate the magazine, the apparatus being arranged so the magazine is insertable into and removable from the storage area at will with the media items in place without removal of the means for rotating from the storage area.

2. Apparatus according to claim 1, comprising a toothed drive wheel for engaging teeth on the magazine to help retract and eject the magazine.

3. Apparatus for storing plural items of recording media and for transferring the plural media items to and from a mechanism for reading and/or writing to the media items, said apparatus comprising:

a storage area for storing a plurality of the media items so that there are a plurality of said media items simultaneously spaced around a common axis of rotation for said media items and there are a plurality of said media items simultaneously spaced along said axis, said mechanism being fixedly located adjacent to said storage area and displaced from said storage area along said axis so that said axis passes through said reading and/or writing mechanism;

means for rotating the stored media items as one body about said axis so as to permit access to any of the media items from only one direction transverse to said axis and;

transfer means operable to collect said media items from said one direction and to transfer said media items between the storage area and said mechanism, the transfer means comprising a platform configured to transport a media item between the storage area and the mechanism and a picker device which is movable relative to the platform to move media items onto and off the platform, the apparatus being adapted for use with media items having spaced sides and a rib extending between said sides, wherein said picker device comprises picker fingers mounted for movement with a component of motion towards one another, each picker finger having two opposed faces oriented relative to one another to define a tapered opening, whereby upon movement of said picker fingers towards a media item located therebetween, said tapered openings accommodate respective sides of the media item and a portion of each picker finger engages said rib for movement of the media item onto and off the platform.

4. Apparatus according to claim 3, wherein said picker fingers are mounted for rotation about spaced axes parallel to one another and transverse to the path of movement of a media item onto and off the platform.

5. Apparatus according to claim 3, wherein said opposed faces on each picker finger are inclined away from each other in a direction facing the other picker finger.

6. Apparatus according to claim 3, wherein each said picker finger has a tooth disposed thereon to engage said rib of the media item.

7. Apparatus according to claim 6, wherein said tooth has a lower one of said inclined opposed faces on its upper side.

8. Apparatus according to claim 6, wherein said tooth has a rear face disposed transversely to the path of movement of the item onto and off the platform, for engagement with said rib of a media item.

9. Apparatus according to claim 8, wherein said tooth has a front face inclined outwardly relative to said rear face and defining therewith a wedge-shaped end to the tooth.

10. Apparatus according to claim 3, wherein each said picker finger has an upper tooth disposed thereon to engage an upper edge of a media item.

11. Apparatus according to claim 10, wherein said upper tooth has an upper one of said inclined opposed faces on its lower side.

12. Apparatus for storing plural items of recording media and for transferring the plural media items to and from a mechanism for reading and/or writing to the media items, said apparatus comprising:
   a storage area for storing a plurality of the media items so that there are a plurality of said media items simultaneously spaced around a common axis of rotation for said media items and there are a plurality of said media items simultaneously spaced along said axis, said mechanism being fixedly located adjacent to said storage area and displaced from said storage area along said axis so that said axis passes through said reading and/or writing mechanism;
   means for rotating the stored media items as one body about said axis so as to permit access to any of the media items from only one direction transverse to said axis and;
   transfer means operable to collect said media items from said one direction and to transfer said media items between the storage area and said mechanism, and means for moving the transfer means between the storage area and the mechanism, the transfer means including a first slidable plate and a second slidable plate, the first plate having a cam which cooperates with the transfer means and is profiled so that horizontal sliding of the plate causes vertical movement of the transfer means, the first slidable plate being positioned on one side of the apparatus, the second slidable plate being positioned on the opposite side of the apparatus and interconnected to the first slidable plate so that sliding movement of one of the slidable plates causes the other slidable plate to slide in the opposite direction.

13. Apparatus according to claim 12, wherein the cam is stepped in shape so as to define a plurality of vertical positions for the transfer means.

14. Apparatus according to claim 12, wherein the cam is in the form of a groove engaged by a connecting pin on the transfer means.

15. Apparatus according to claim 12, comprising vertical guide means positioned adjacent the cam for guiding the vertical movement of the transfer means.

16. Apparatus according to claim 15, comprising a fixed plate having a vertical groove providing the vertical guide means.

17. Apparatus according to claim 12, wherein the first and second slidable plates are interconnected by a pivotably mounted arm.

18. Apparatus according to claim 12, wherein the second slidable plate comprises a cam oppositely profiled to the cam of the first slidable plate and which also co-operates with the transfer means.

19. Apparatus according to claim 12, wherein movement of said slidable plates effects opening of a door in the apparatus for receiving media items.

20. Apparatus according to claim 12, wherein movement of said slidable plates effects locking of a door in the apparatus for receiving media items.

21. Autochanger apparatus for storing a multiplicity of recording media cartridges and for reading data from and/or writing data to recording media in the cartridges, said cartridges each having two major faces and four side faces extending between said major faces, said apparatus being accommodated entirely within dimensions for computer peripheral devices and comprising:
   a housing dimensioned to conform to said dimensions and having first and second rectangular major faces, two side walls extending along respective longer sides of said first and second major faces, and a front panel and a rear wall extending along respective shorter sides of said first and second major faces;
   a mechanism for reading data from and/or writing data to the media cartridges, said mechanism being located within said housing adjacent said first major face and towards said rear wall, and having an opening facing towards said front panel for receiving the media cartridges;
   turntable means for receiving and rotating about an axis a magazine for accommodating a multiplicity of the media cartridges arranged in a pair of stacks of at least two cartridges each, said stacks being parallel to one another with major faces of the cartridges in each stack being juxtaposed and generally parallel to said first and second major faces, said axis being transverse to said first and second major faces, and said turntable means being located adjacent said second major face, whereby the magazine accommodated by said turntable means is disposed in a storage area located within said housing generally adjacent a side of said mechanism remote from said first major face;
   transfer means located generally between said front panel and said mechanism, and operable to transport the media cartridges between said mechanism and the magazine disposed in said storage area, along a path extending forwardly from said storage area towards said front panel, alongside and behind said front panel, and rearwardly towards said mechanism;
   said front panel including an opening aligned with said storage area and permitting passage of the magazine between said storage area and a location external to said apparatus.

22. The apparatus of claim 21 wherein the dimensions are for a 5¼ inch form factor volume.

23. Apparatus for reading and/or writing signals on plural tapes each located in a separate cassette, each cassette having substantially the same shape and size, each cassette having a top and bottom that are generally parallel rectangular faces connected together by narrow side and end walls arranged so the tapes are accessible via one of the side walls, the apparatus comprising:
   a turntable having an axis of rotation, a read and/or write mechanism for the tapes, the mechanism including a drive for the tapes,
   a magazine for simultaneously holding a plurality of the cassettes, the magazine having an axis in a central region of the magazine, the magazine being positionable on the turntable so the axis of rotation of the turntable and the magazine axis are substantially coincident, the magazine including at least one level extending at a right angle to said axes for simultaneously receiving and positioning a plurality of said cassettes so while the plurality of cassettes are located at said level (a) a rectangular area is circumscribed and defined by the non-abutting exterior edges of the top faces of said plurality of cassettes and (b) said axes (i) pass between spaced adjacent parallel side walls of a pair of said cassettes, (ii) are coincident with a first center line of said rectangular area at a right angle to the top and bottom faces of said plurality of cassettes and (iii) intersect a second center line of said rectangular area that extends parallel to parallel side walls of a pair of said cassettes, the magazine having openings enabling each cassette on said level to be translated into and out of the magazine so the end walls of the cassettes move in the direction of cassette translation and cassettes on opposite sides of the second center line move in opposite directions relative to the magazine axis as they move into and out of the magazine along a path between the magazine and the read and/or write mechanism, means for transporting one of the cassettes at a time along the path between the magazine and the read and/or write mechanism so tapes in the cassettes can be driven by the tape drive, the means for transporting translating all cassettes at said level relative to the magazine along the same straight path, movement of cassettes along the straight path being at right angles to the side walls of cassettes in the magazine and in the direction of extent of the end walls of cassettes in the magazine, and the turntable turning the magazine about both said axes to position the plurality of cassettes on said level so they are at said path, said turntable, read and/or write mechanism and means for transporting being in a housing having a wall with an opening dimensioned and positioned so the magazine can pass back and forth through the housing opening into the housing and onto the turntable so the magazine and turntable axes are substantially coincident.

24. The apparatus of claim 23 wherein the housing is shaped as a right parallelepiped having a size enabling the housing to fit in a 5¼ inch form factor volume of a personal computer.

25. The apparatus of claim 24 wherein the cassettes are Digital Audio Tape (DAT) cassettes.

26. The apparatus of claim 25 wherein the read and/or write mechanism is positioned in the housing at a level that differs from the level occupied by the magazine so the cassette path between the level of the read and/or write mechanism and the level of the magazine includes a portion parallel to said axes.

27. The apparatus of claim 26 wherein the read and/or write mechanism is positioned in the housing so the path at the level occupied by the read and/or write mechanism is in a plane parallel to the path at the level occupied by the magazine.

28. The apparatus of claim 23 wherein the read and/or write mechanism is positioned in the housing at a level that differs from the level occupied by the magazine so the cassette path between the level of the read and/or write mechanism and the level of the magazine includes a portion parallel to said axes.

29. The apparatus of claim 28 wherein the read and/or write mechanism is positioned in the housing so the path at the level occupied by the read and/or write mechanism is in a plane parallel to the path at the level occupied by the magazine.

* * * * *